US011159951B2

(12) United States Patent
Kazmi et al.

(10) Patent No.: US 11,159,951 B2
(45) Date of Patent: Oct. 26, 2021

(54) SYSTEM AND METHOD OF SIGNALING SPECTRUM FLATNESS CONFIGURATION

(71) Applicant: Telefonaktiebolaget LM Ericsson (publ), Stockholm (SE)

(72) Inventors: Muhammad Kazmi, Sundbyberg (SE); Eric Nordström, Stockholm (SE); Esther Sienkiewicz, Ottawa (CA); Christian Bergljung, Lund (SE); Imadur Rahman, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/981,434

(22) PCT Filed: Mar. 19, 2019

(86) PCT No.: PCT/SE2019/050247
§ 371 (c)(1),
(2) Date: Sep. 16, 2020

(87) PCT Pub. No.: WO2019/182502
PCT Pub. Date: Sep. 26, 2019

(65) Prior Publication Data
US 2021/0029551 A1 Jan. 28, 2021

Related U.S. Application Data
(60) Provisional application No. 62/644,613, filed on Mar. 19, 2018.

(51) Int. Cl.
*H04W 16/14* (2009.01)
*H04L 25/03* (2006.01)
*H04L 27/26* (2006.01)

(52) U.S. Cl.
CPC ....... *H04W 16/14* (2013.01); *H04L 25/03343* (2013.01); *H04L 25/03834* (2013.01); *H04L 27/2614* (2013.01)

(58) Field of Classification Search
CPC ......... H04L 25/03343; H04L 25/03834; H04L 27/2614; H04W 16/14
See application file for complete search history.

(56) References Cited

U.S. PATENT DOCUMENTS

| 10,355,956 | B2 * | 7/2019 | Yang | .................. | H04L 43/0876 |
| 2016/0072594 | A1 * | 3/2016 | Yuan | .................. | H04B 17/0085 455/424 |
| 2017/0356979 | A1 * | 12/2017 | Georgiou | .............. | G01S 5/0215 |

FOREIGN PATENT DOCUMENTS

| EP | 3291232 A1 | 3/2018 |
| WO | 2013188030 A2 | 12/2013 |

OTHER PUBLICATIONS

International Search Report dated Jun. 18, 2019 for International Application No. PCT/SE2019/050247 filed on Mar. 19, 2019, consisting of 9-pages.

(Continued)

Primary Examiner — David S Huang
(74) Attorney, Agent, or Firm — Christopher & Weisberg, P.A.

(57) ABSTRACT

A first radio node, Node1, in a wireless communication network transmits a signal to a second radio node, Node2, under a constraint of spectrum flatness—meaning a maximum variation of power of the transmitted signal, within a transmission bandwidth. Spectrum flatness configurations may be determined by a network node and transmitted to Node1. Alternatively, Node1 may determine a spectrum flatness configuration and transmit it to a network node. In either case, Node1 adapts one or more coefficients of a transmission filter such that a transmission to Node2 will be (Continued)

in accordance with the obtained spectrum flatness configuration, and then transmits a signal to Node2 using the transmission filter with the adapted coefficients.

20 Claims, 16 Drawing Sheets

(56) References Cited

OTHER PUBLICATIONS

3GPP TSG-RAN WG4 Meting #85 R4-1714445; Title: WF on pi/2 BPSK spectrum shaping and power class in FR2; Agenda Item: 9.4.3.1.2; Source: Intel Corporation, Apple, Qualcomm, Date and Location: Nov. 27-Dec. 1, 2017, Reno, Nevada, USA, consisting of 7-pages.

* cited by examiner

SYSTEM AND METHOD OF SIGNALING SPECTRUM FLATNESS CONFIGURATION

CROSS-REFERENCE TO RELATED APPLICATIONS

This application is a Submission Under 35 U.S.C. § 371 for U.S. National Stage Patent Application of International Application No.: PCT/SE2019/050247, filed Mar. 19, 2019 entitled " SYSTEM AND METHOD OF SIGNALING SPECTRUM FLATNESS CONFIGURATION," which claims priority to U.S. Provisional Application No.: 62/644,613, filed Mar. 19, 2018, the entireties of both of which are incorporated herein by reference.

TECHNICAL FIELD

The present invention relates generally to wireless communications, and in particular to a system and method of communicating spectrum flatness configuration between nodes in a wireless network prior to engaging in wireless communication between the nodes.

BACKGROUND

Wireless communication networks provide voice and data communication between a network of fixed nodes and a large number of mobile, wireless devices, such as mobile telephones, smartphones, laptop and tablet computers, wearable devices, vehicles, and the like. As well known in the art, Radio Frequency (RF) carrier waves are modulated with information, and transmitted from network nodes to wireless devices (downlink transmissions), and vice versa (uplink transmissions). Many types of carrier wave modulation are known in the art. One impact of the selection of a modulation scheme is the Peak to Average Power Ratio (PAPR) of the transmitting Power Amplifier (PA). A low PAPR allows the PA to operate at a higher average power, and hence more efficiently. Since the PA is large consumer of power, device lifetime may be extended by selecting an appropriate modulation scheme.

Modulation in NR

In New Radio (NR), the 3GPP $5^{th}$ Generation Radio Access Network (RAN), at least the following modulation schemes are specified in Release 15: π/2-BPSK (Binary Phase Shift Keying), QPSK (Quadrature PSK), 16QAM (Quadrature Amplitude Modulation), 64QAM, 256QAM.

The π/2-shift BPSK (π/2 BPSK) modulation is a special form of binary phase modulation scheme with π/2 phase shift counter-clockwise with respect to the original BPSK modulation. According to 3GPP Technical Standard TS 38.211 v15.0.0, an encoded bit stream is transmitted using π/2-BPSK modulation as follows. A bit b(i) is mapped to a complex-valued π/2-BPSK modulation symbol x according to the following pre-defined expression:

$$x = \frac{e^{j\frac{\pi}{2}(i \bmod 2)}}{\sqrt{2}}[(1-2b(i)) + j(1-2b(i))]$$

This means the two different modulated symbols have phase difference of π/2 in the signal constellation diagram (I-Q plane). An example of π/2-BPSK modulation, where the phases of the two symbols are π/2 and −π/2 respectively, is shown in the I-Q plane in FIG. 1.

Spectrum Shaping

An attractive property of the π/2-BPSK modulation is low peak-to-average-power-ratio (PAPR). In order to reduce the PAPR even further, filtering or precoding can be applied to smooth the signal in time before transmission. This has the side-effect of changing the spectral characteristics of the signal (spectrum shaping) and distorting signal quality. As illustrated in FIGS. 2A-2C, there are several possible locations in a transmitter chain where spectrum shaping may be applied.

It is possible to limit the impact on the received signal quality at the receiver by selecting an appropriate filter in the transmitter. Some elements of a NR Orthogonal Frequency Division Multiplex (OFDM) signal are not π/2-2 BPSK modulated, such as some reference signals (RS), e.g., Sounding RS (SRS). In such cases, spectrum shaping can be made to work in the location depicted in FIG. 2B, but then applying the filter in frequency domain instead.

Spectrum Flatness

The spectrum flatness is one of the performance criterion to define modulation quality of a signal transmitted by the User Equipment (UE), a generic term for mobile devices (3GPP TS 38.101-1 § 6.4.2, v15.0.0). In general, spectrum flatness refers to a maximum variation of power with which a first radio node may transmit a signal to a second radio node, within a transmission bandwidth. FIG. 3 depicts, for example, a power vs. frequency graph of a transmitted signal. Over the allocated frequency block—which may comprise, for example, the bandwidth of Resource Blocks (RBs) allocated to the signal transmission—the single varies in power only between the limits S1 and S2. The distance S1-S2 thus reflects the spectrum flatness of the signal transmission.

A specific example of spectrum flatness is an Error Vector Magnitude (EVM) equalizer spectrum flatness. According to 3GPP TS 38.101-1 v15.0.0, the EVM equalizer spectrum flatness, or simply spectrum flatness, is defined in terms of the maximum peak-to-peak ripple of the equalizer coefficients (dB) across the allocated uplink block in the EVM measurement. The peak-to-peak ripple is the maximum compensation that can be applied by the measurement equipment for any ripple in the transmitter chain due to baseband processing (e.g., by pulse shaping) and RF processing. The basic measurement interval is the same as for EVM, e.g., 10 subframes etc. Pulse shaping of the modulated signal can be made to a degree set by the EVM requirement subject to the maximum ripple compensation allowed by EVM spectral flatness requirement, the in-band emissions requirement for non-allocated RBs and the unwanted emissions requirements.

In NR, π/2-BPSK is one of the modulation schemes standardized for uplink transmission. One main advantage of π/2-BPSK is that the π/2-BPSK modulated signal can operate close to the saturation point of the power amplifier (PA) in the transmitter chain. It is therefore associated with low peak-to-average-power (PAPR). This means π/2-BPSK modulated signal can be transmitted by the transmitter (e.g., UE) with relatively higher power compared to the signals modulated with other modulations, e.g., QPSK, 16QAM, etc. The increase in transmit power leads to increased coverage of the UE with respect to the serving cell. The transmit power can further be increased by applying specific spectrum shaping filter. However, higher power output by means of spectrum shaping leads to large variation of the transmitted signal in the frequency domain. For example it has been proposed in 3GPP document R4-1714445 (in RAN4 #85 meeting, December 2017) to specify 20 dB of signal variation over the transmission bandwidth when π/2-BPSK is employed by the UE. This larger variation in turn puts greater constraint on the receiver implementation, e.g., in the base station (known as gNB in NR). For example, higher variation of the transmitted signal in the frequency domain makes it difficult for the receiving node to receive the signal without demodulation loss (receiver desensitization) without introducing excessive receiver processing. Therefore a solution which is a good compromise between the higher output power of the transmitting node and the complexity in the receiving node is needed.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention disclosed and claimed herein, a first radio node (Node1) transmits a signal to a second radio node (Node2) under a constraint of spectrum flatness—meaning a maximum variation of power of the transmitted signal, within a transmission bandwidth. Spectrum flatness configurations may be determined, or may be pre-determined, and a spectrum flatness configuration may be selected from among those available. The configurations may comprise absolute power variations (e.g., in dB), or may include a first power variation and one or more offsets or allowable increments from the first power variation. The spectrum flatness configurations may include a maximum power reduction parameter.

In one embodiment, the first radio node may receive information regarding a spectrum flatness configuration from another node, adapt its transmitter accordingly, and transmit a signal to the second radio node using the received spectrum flatness configuration. In this embodiment, the spectrum flatness configuration information may be determined by the second radio node (due to receive the transmission), or by a different network node (Node3), which transmits the spectrum flatness configuration information directly to the first radio node, or to the second radio node for it to relay to the first radio node. The spectrum flatness configuration(s) may be determined in response to a variety of factors, including a receiver configuration of the second radio node, a density of transmission of reference signals by the first radio node, a coverage level of the first radio node with respect to the second radio nodes, a spectrum flatness recommendation from the first radio node, and a modulation format recommendation from a scheduler.

In another embodiment, the first radio node may itself determine a spectrum flatness configuration, transmit the determined spectrum flatness configuration to the second radio node or a network node, adapt its transmitter according to the determined spectrum flatness configuration, and transmit a signal to the second node using the determined received spectrum flatness configuration. In the case that the first radio node transmits the determined spectrum flatness configuration to a network node, the network node would relay it on to the second radio node. The first radio node may determine the spectrum flatness configuration in response to a variety of factors, including those mentioned above (e.g. second radio node receiver configuration; first radio node coverage level), as well as a power amplifier configuration at the first radio node and the first radio node available battery power.

In one exemplary scenario Node1 and Node2 are a User Equipment (UE) and a base station (BS), e.g., gNB, respectively. In another exemplary scenario Node1 and Node2 are a BS and a UE, respectively. In yet another exemplary scenario Node1 and Node2 are both UEs capable of device to device (D2D) communication. In another exemplary scenario, Node3 can be a network node without radio circuits (e.g., in the core network) or a radio node (e.g., BS or UE). The embodiments described above are applicable for all these exemplary scenarios.

One embodiment relates to a method, performed by a first radio node operative in a wireless communication network, of adapting the spectrum flatness of a transmitted signal. Information about a spectrum flatness configuration, comprising a maximum variation of power with which the first radio node may transmit a signal to a second radio node within a transmission bandwidth, is received from a network node. One or more coefficients of a transmission filter are adapted such that a transmission to the second radio node will be in accordance with the received spectrum flatness configuration. A signal is transmitted to the second radio node using the transmission filter with the adapted coefficients.

Another embodiment relates to a method, performed by a network node operative in a wireless communication network, of determining an acceptable spectrum flatness of a transmitted signal. One or more spectrum flatness configurations, each comprising a maximum variation of power with which a first radio node may transmit a signal to a second radio node within a transmission bandwidth, are determined. Information about the spectrum flatness configurations is sent towards the first radio node.

Yet another embodiment relates to a method, performed by a first radio node operative in a wireless communication network, of determining a spectrum flatness and adapting a transmitted signal to the determined spectrum flatness. A spectrum flatness configuration, comprising a maximum variation of power with which the first radio node transmits a signal to a second radio node within a transmission bandwidth, is determined. The determined spectrum flatness configuration is transmitted to a network node. One or more coefficients of a transmission filter are adapted such that a transmission to the second radio node will be in accordance with the determined spectrum flatness configuration. A signal is transmitted to the second radio node using the transmission filter with the adapted coefficients.

Still another embodiment relates to a first radio node operative in a wireless communication network. The first radio node includes wireless communication circuitry and processing circuitry operatively connected to the wireless communication circuitry. The processing circuitry is adapted to receive, from a network node, information about a spectrum flatness configuration comprising a maximum variation of power with which the first radio node may transmit a signal to a second radio node within a transmission bandwidth; adapt one or more coefficients of a transmission filter such that a transmission to the second radio node will be in accordance with the obtained spectrum flatness configuration; and transmit a signal to the second radio node using the transmission filter with the adapted coefficients.

Still another embodiment relates to a network node operative in a wireless communication network. The network node includes communication circuitry and processing circuitry operatively connected to the communication circuitry. The processing circuitry is adapted to determine one or more spectrum flatness configurations, each comprising a maximum variation of power with which a first radio node may transmit a signal to a second radio node within a transmission bandwidth; and send information about the spectrum flatness configurations towards the first radio node.

Still another embodiment relates to a first radio node operative in a wireless communication network. The first radio node includes wireless communication circuitry and processing circuitry operatively connected to the wireless communication circuitry. The processing circuitry is adapted to determine a spectrum flatness configuration comprising a maximum variation of power with which the first radio node transmits a signal to a second radio node within a transmission bandwidth; transmit the determined spectrum flatness configuration to a network node; adapt one or more coefficients of a transmission filter such that a transmission to the second radio node will be in accordance with the determined spectrum flatness configuration; and transmit a signal to the second radio node using the transmission filter with the adapted coefficients.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
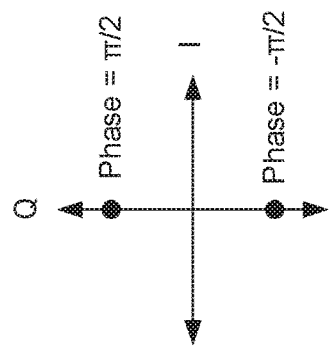
FIG. 1 is a constellation diagram of a π/2-shift BPSK modulation scheme.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. Although at least some of the embodiments herein may be described as applicable in certain contexts and/or wireless network types for illustrative purposes, the embodiments are similarly applicable in other contexts and/or wireless network types not explicitly described.

Apparatuses and Terminology

Reference is made in this disclosure to a first radio node (referred to herein as Node1) and a second radio node (Node2). As used herein, a "radio node" is a node, operative in a wireless communication network, that communicates over the air interface of that network. In other words, radio nodes make up the Radio Access Technology (RAT) of the wireless communication network. The first radio node and the second radio node may engage in two-way communication—that is, the first radio node may transmit signals (e.g., representing voice or data) to the second radio node, and may also receive signals from the second radio node. For simplicity and ease of explanation, embodiments described herein focus on one direction of this communication—from the first radio node to the second radio node. Of course, embodiments may also be implemented on the reverse direction.

In the embodiments, in one example Node1 can be a User Equipment (UE) and Node2 can be a base station (BS), known in NR as gNB. In another example, Node1 can be a BS and Node2 can be a UE. In yet another example, Node1 can be a first UE (UE1) and Node2 can be a second UE (UE2), where UE1 and UE2 are involved in direct device-to-device (D2D) communication. Examples of D2D communication are proximity service (ProSe), ProSe direct discovery, ProSe direct communication, V2X (where X can denote V, I or P e.g. V2V, V2I, V2P etc.) etc.

In some embodiments a third node (Node3) is also used. In general, Node3 may be a network node. As used herein, the term "network node" refers to any node operative in a wireless communication network. In particular, a network node may be a radio node (i.e., UE or BS), or may be a core network node which does not include radio circuits (e.g., transceiver, antennas, and the like) to enable communication across the air interface of the wireless communication network. As used herein, "radio nodes" are a subset of "network nodes," and denote those network nodes with RF circuits and which communicate over the air interface of the wireless communication network. Examples of network nodes are NodeB, base station (BS), multi-standard radio (MSR) radio node such as MSR BS, eNodeB, eNB, gNodeB, gNB, MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC) etc.

Figure 4:
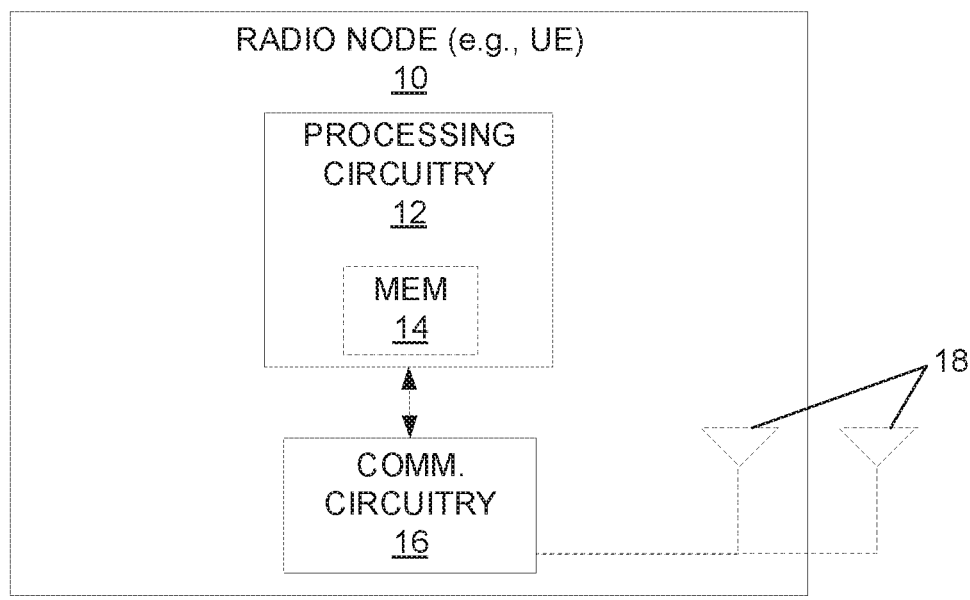
FIG. 4 is a block diagram of a radio node, in particular a User Equipment (UE), showing hardware components.

FIG. 4 illustrates a radio node 10 in the form of a UE. A UE 10 is any type of device capable of communicating with another radio node, such as a BS or another UE, using radio signals. A UE 10 may therefore refer to a machine-to-machine (M2M) device, a machine-type communications (MTC) device, a Narrowband Internet of Things (NB IoT) device, etc. The UE 10 may also comprise a cellular telephone or "smartphone," however, the term UE should be understood to encompass any radio node 10, even one that does not have a "user." A UE 10 may also be referred to as a radio device, a radio communication device, a wireless device, a wireless terminal, or simply a terminal—unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), V2X UE, ProSe UE, PDA, iPAD, Tablet, etc. In the discussion herein, the terms machine-to-machine (M2M) device, machine-type communication (MTC) device, wireless sensor, and sensor may also be used. It should be understood that these devices, although referred to as UEs 10, may be configured to transmit and/or receive data without direct human interaction.

In some embodiments, the UE 10 includes a user interface, including e.g. a display, touchscreen, keyboard or keypad, microphone, speaker, and the like) (not shown); in other embodiments, such as in many M2M, MTC, or NB IoT scenarios, the UE 10 may include only a minimal, or no, user interface. The UE 10 also includes processing circuitry 12; memory 14; and communication circuitry 16, including, e.g., a RF transceiver, connected to one or more antennas 18, to effect wireless communication across an air interface to one or more other radio nodes, such as a base station, access points, and/or other UEs. As indicated by the dashed lines, the antenna(s) 18 may protrude externally from the UE 10, or the antenna(s) 18 may be internal. In some embodiments, a UE 10 may additionally include features such as a camera, accelerometer, satellite navigation signal receiver circuitry, vibrating motor, and the like (not depicted in FIG. 4).

According to embodiments of the present invention, the memory 14 is operative to store, and the processing circuitry 12 is operative to execute, software which when executed is operative to cause the UE 10 to adapt the spectrum flatness of a transmitted signal. In particular, the software, when executed on the processing circuitry 12, is operative to perform a method 100 and/or a method 300 described and claimed herein. The processing circuitry 12 in this regard may implement certain functional means, units, or modules.

Figure 5:
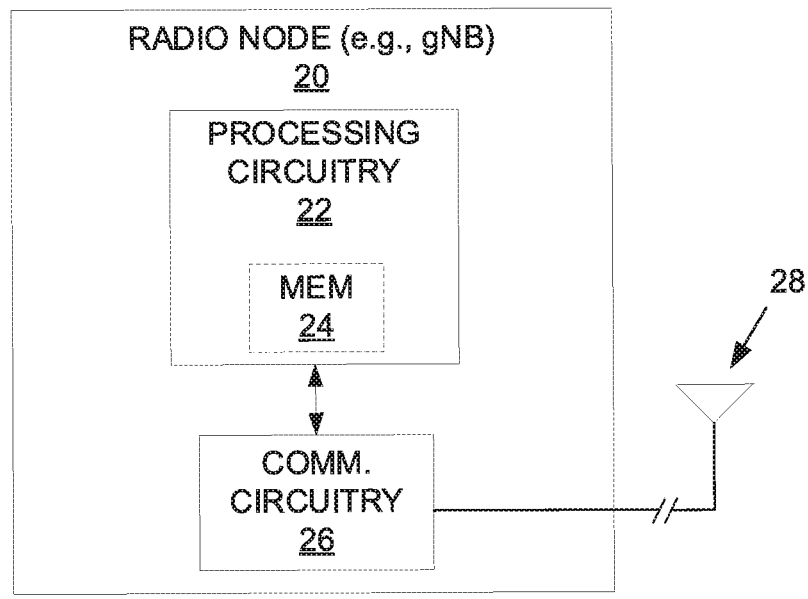
FIG. 5 is a block diagram of a radio node, in particular a NR base station (gNB), showing hardware components.

FIG. 5 illustrates a radio node 20 in the form of a serving node of one or more UEs 10, known in the art as a base station, NodeB, NB, eNB, gNB, Radio Base Station, Base Transceiver Station, Access Point, or the like. The BS 20 includes processing circuitry 22; memory 24; and communication circuitry 26, including e.g. a RF transceiver, connected to one or more antennas 28, to effect wireless communication across an air interface to one or more UEs 10. As indicated by the broken connection to the antenna(s) 28, the antenna(s) 28 may be physically located separately from the base station 20, such as mounted on a tower, building, or the like. Although the memory 24 is depicted as being internal to the processing circuitry 22, those of skill in the art understand that the memory 24 may also be external. Those of skill in the art additionally understand that virtualization techniques allow some functions nominally executed by the processing circuitry 22 to actually be executed by other hardware, perhaps remotely located (e.g., in the so-called "cloud").

According to embodiments of the present invention, the processing circuitry 22 is operative to cause the radio node 20 to determine a spectrum flatness and/or adapt the spectrum flatness of a transmitted signal. In particular, the processing circuitry 22 is operative to perform either of the methods 100 or 300, and/or a method 200 described and claimed herein. The processing circuitry 22 in this regard may implement certain functional means, units, or modules.

Figure 6:
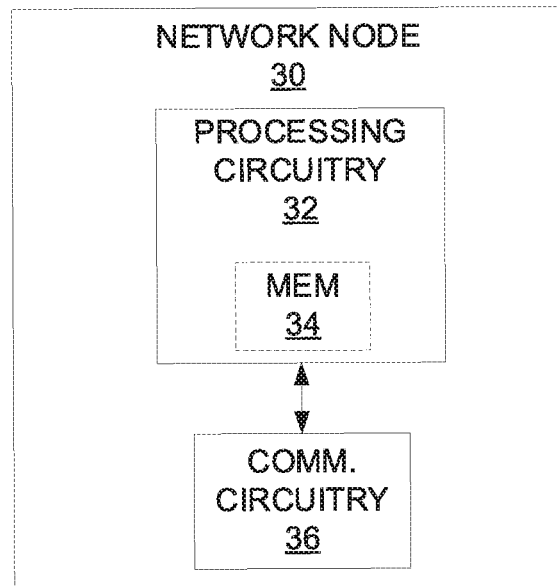
FIG. 6 is a block diagram of a network node, in particular a core network node without a radio interface, showing hardware components.

FIG. 6 illustrates a network node 30 in the form of a core network node, without radio circuitry. The network node 30 includes processing circuitry 32; memory 34; and communication circuitry 36 connected to, e.g., one or more wired links, to effect communication across the links to other network nodes 30 (which may include radio nodes, such as BS 20). Although the memory 34 is depicted as being internal to the processing circuitry 32, those of skill in the art understand that the memory 34 may also be external. Those of skill in the art additionally understand that virtualization techniques allow some functions nominally executed by the processing circuitry 32 to actually be executed by other hardware, perhaps remotely located (e.g., in the so-called "cloud").

According to embodiments of the present invention, the processing circuitry 32 is operative to cause the network node 30 to determine a spectrum flatness and communicate information regarding a spectrum flatness configuration toward a first radio node 10, 20. In particular, the processing circuitry 32 is operative to perform the method 200 described and claimed herein. The processing circuitry 32 in this regard may implement certain functional means, units, or modules.

The term "radio access technology (RAT)" may refer to, e.g. UTRA, E-UTRA, narrow band internet of things (NB-IoT), WiFi, Bluetooth, next generation RAT (NR), 4G, 5G, etc. Any of the first and the second radio nodes may be capable of supporting a single or multiple RATs.

The term "signal" as used herein can be any physical signal or physical channel transmitted by a node. Examples of downlink physical signals are reference signals, such as PSS, SSS, CRS, PRS, CSI-RS, DMRS, NRS, NPSS, NSSS, SS, MBSFN RS, etc. Examples of uplink physical signals are reference signal such as SRS, DMRS etc. The term physical channel (e.g., in the context of channel reception) used herein is also called referred to as "channel." The physical channel carries higher layer information (e.g. RRC, logical control channel, etc). Examples of downlink physical channels are PBCH, NPBCH, PDCCH, PDSCH, sPDSCH, MPDCCH, NPDCCH, NPDSCH, E-PDCCH, etc. Examples of uplink physical channels are sPUCCH, sPUSCH, PUSCH, PUCCH, NPUSCH, PRACH, NPRACH, etc.

The term "modulated signal" as used herein can be any radio frequency carrier signal, which is modulated, by any modulation scheme, to convey information such as voice or data. Examples of modulation schemes are BPSK, $\pi/2$-BPSK, QPSK, $\pi/4$-QPSK, 16QAM, 64QAM, 256QAM, 1024QAM, etc.

The term "time resource" used herein may correspond to any type of physical resource or radio resource expressed in terms of length of time. Signals are transmitted or received by a radio node over a time resource. Examples of time resources are: symbol, time slot, subframe, radio frame, TTI, shortened TTI (sTTI), subslot, interleaving time, mini-slot, etc.

The term "spectrum flatness" as used herein refers to the maximum variation in power of a transmitted signal in frequency domain within a transmitted bandwidth. In one specific example spectrum flatness is defined as the maximum peak-to-peak ripple of the equalizer coefficients expressed in dB across the allocated frequency block over which signal is transmitted. The term allocated frequency block may also be called as transmitted frequency block. Examples of allocated frequency block are carrier frequency, bandwidth, etc., over which the signal is transmitted. The allocated frequency block can be expressed in terms of part or range of carrier frequency, bandwidth or part of bandwidth, number of resource blocks, number of subcarriers etc.

Method in Node1 of Receiving Spectrum Flatness Configuration Information and Using it to Adapt the Spectrum Flatness of a Transmitted Signal In one embodiment, the first radio node (Node1) receives information regarding a spectrum flatness configuration from another node (Node2 or Node3), adapts its transmitter accordingly, and transmits a signal to the second radio node (Node2) using the received spectrum flatness configuration. In one embodiment, one or more spectrum flatness configurations are determined by the receiving radio node, Node2. In another embodiment, a different network node (Node3) may determine one or more spectrum flatness configurations for use by Node1 for transmissions to Node2. Either Node2 or Node3 then transmits the spectrum flatness configuration towards Node1. That is, Node2 may generate the information and transmit it directly to Node1. Alternatively, Node3 may generate the information and transmit it to Node2, to relay on to Node1. In all of these embodiments, Node1 receives the information about the spectrum flatness configurations, which is applied by Node1 to signals it transmits to Node2. Node2 or Node3 can transmit the information to Node1 (or Node3 can transmit the information to Node2) using higher layer signaling (e.g. RRC message) and/or using lower layer signaling (e.g. MAC, DCI over L1 channel such as PDCCH, etc.).

Figure 7:
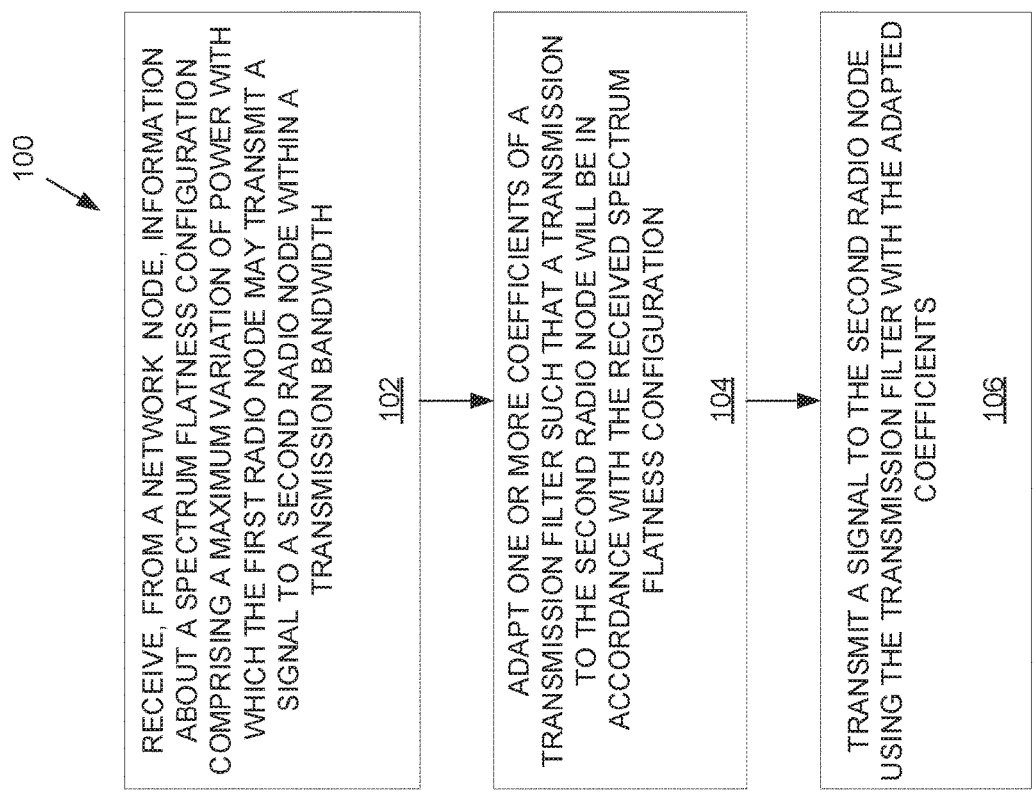
FIG. 7 is a flow diagram of a method, performed by a first radio node, of adapting the spectrum flatness of a transmitted signal.

FIG. 7 depicts a method 100, performed by a first radio node operative in a wireless communication network, of adapting the spectrum flatness of a transmitted signal, in accordance with particular embodiments. Information about a spectrum flatness configuration, comprising a maximum variation of power with which the first radio node may transmit a signal to a second radio node within a transmission bandwidth, is received from a network node (block 102). One or more coefficients of a transmission filter are adapted such that a transmission to the second radio node will be in accordance with the received spectrum flatness configuration (block 104). A signal is transmitted to the second radio node using the transmission filter with the adapted coefficients (block 106).

In one example the determining node (i.e., Node2 or Node3) determines the spectrum flatness configuration out of a plurality of possible configurations. In particular, in one embodiment Node2 or Node3 determines one out of two possible spectrum flatness configurations. The different spectrum flatness configurations may be pre-defined or they may be created or generated by Node2 or Node3. In the case that the spectrum flatness configurations are pre-defined, Node1 is configured with the configurations, and Node1 receives (from Node2 or Node3) an identifier of which spectrum flatness configuration has been determined. In the case that the spectrum flatness configurations are not pre-defined, then Node1 receives additional information related to the determined configuration, such as the maximum allowed peak-to-peak power variation, a bandwidth over which the configuration is applicable, etc.

Figure 8:
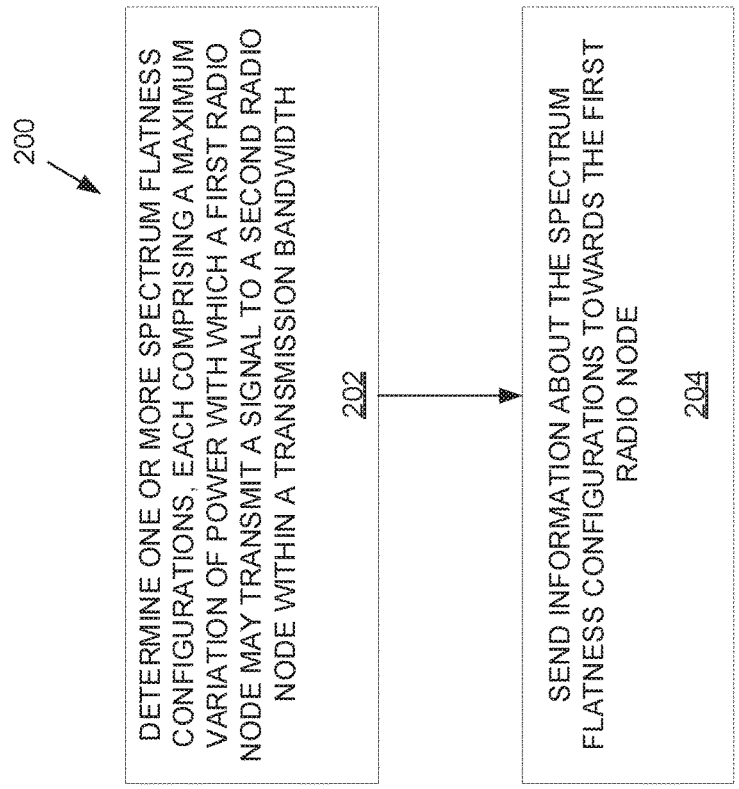
FIG. 8 is a flow diagram of a method, performed by a network node, of determining an acceptable spectrum flatness of a transmitted signal.

FIG. 8 depicts a method, performed by a network node operative in a wireless communication network, of determining an acceptable spectrum flatness of a transmitted signal, in accordance with particular embodiments. One or more spectrum flatness configurations, each comprising a maximum variation of power with which a first radio node may transmit a signal to a second radio node within a transmission bandwidth, are determined (block 202). Information about the spectrum flatness configurations is sent towards the first radio node (block 204). If the network node is Node2, sending information about the spectrum flatness configurations towards the first radio node comprises transmitting the information to Node1. If the network node is a different node (Node3), sending information about the spectrum flatness configurations towards the first radio node comprises transmitting the information to Node2, which will then relay it to Node1.

Figure 3:
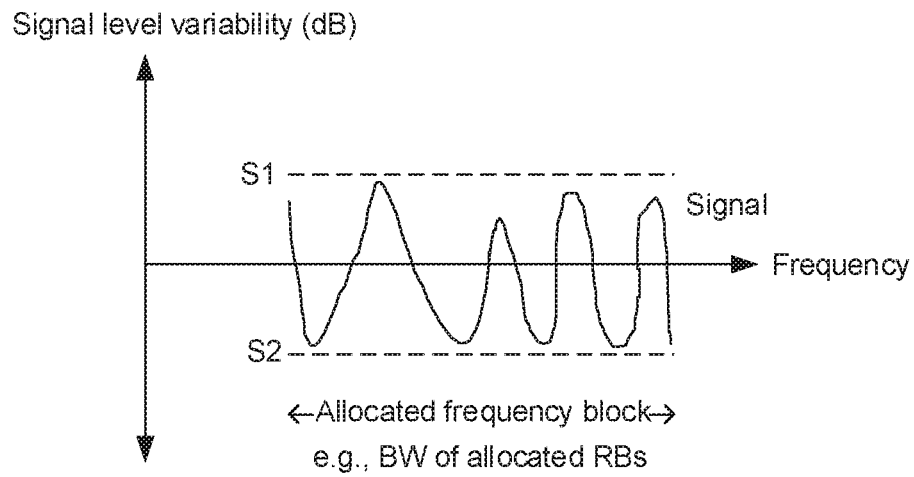
FIG. 3 is a power v. frequency graph of a transmitted signal showing variations of power within limits across an allocated bandwidth.

The different spectrum flatness configurations differ in terms of the maximum peak-to-peak ripple, or variation (X), of a signal transmitted within the allocated frequency block (e.g. allocated or assigned resource blocks, RB). The spectrum flatness requirement is illustrated with an example in FIG. 3. In this example, to meet the spectrum flatness, the signal can be transmitted such that within the allocated frequency block the maximum peak-to-peak ripple remains within X dB, i.e., $|S1-S2| \leq X$ dB. Different spectrum flatness configurations will differ in terms of at least the values of X, as described with several examples in Tables 1-4. The spectrum flatness configuration can also be expressed in terms of a mask by which the maximum allowed signal variability (ripple) depends on the frequency of the allocated resource block(s).

The different spectrum flatness configurations may further be associated with, or applicable to, a signal that is modulated with one particular modulation type, e.g., $\pi/2$-BPSK. For example, one set of spectrum flatness configurations (e.g., 2 or more) can be defined for one type of modulation scheme (e.g., $\pi/2$-BPSK), while another set of spectrum flatness configurations (e.g., 2 or more) can be defined for another type of modulation scheme (e.g., QPSK).

Consider an example of two possible spectrum flatness configurations applicable for a signal modulated with a given type of modulation: a first spectrum flatness configuration (SFC1) and a second spectrum flatness configuration (SFC2). In this example SFC1 and SFC2 comprise maximum allowed peak-to-peak ripple of X1 dB and X2 dB respectively, where X1<X2. SFC1 may correspond to low level of peak-to-peak ripple while SFC2 may correspond to relatively higher level of peak-to-peak ripple.

In one specific example X1=14 dB and X2=20 dB. In another specific example, X1=12 dB and X2=20 dB. In another specific example, X1=12 dB and X2=18 dB. In yet another specific example, X1=14 dB and X2=18 dB.

Two sets of spectrum flatness configurations, for a given modulation type, are described by general examples in Table 1 and Table 2. Also, two sets of configurations are described by specific examples in Table 3 and Table 4.

TABLE 1

A general example of two sets of spectrum flatness configuration

| Configuration ID | spectrum flatness configuration | Maximum peak-to-peak transmit power ripple (dB) within frequency block |
|---|---|---|
| 0 | SFC1 | X1 |
| 1 | SFC2 | X2; where X2 > X1 |

TABLE 2

A general example of two sets of spectrum flatness configuration

| Configuration ID | spectrum flatness configuration | Maximum peak-to-peak transmit power ripple (dB) within frequency block |
|---|---|---|
| 0 | SFC1 | X1 |
| 1 | SFC2 | X1 + Δ; where Δ > 0 |

Δ can be known to Node1 as a predefined value, or it can also be signalled from Node2 or Node3 to Node1.

TABLE 3

A Specific example of two sets of spectrum flatness configuration

| Configuration ID | spectrum flatness configuration | Maximum peak-to-peak power ripple (dB) |
|---|---|---|
| 0 | SFC1 | 14 |
| 1 | SFC2 | 20 |

TABLE 4

A specific example of two sets of spectrum flatness configuration

| Configuration ID | spectrum flatness configuration | Maximum peak-to-peak power ripple (dB) |
|---|---|---|
| 0 | SFC1 | 14 |
| 1 | SFC2 | 14 + 6 |

In this above specific example in Table 4, Δ=6 dB as an example.

Consider another example of three possible spectrum flatness configurations applicable for a signal modulated with a given type of modulation: SFC1, SFC2 and a third spectrum flatness configuration (SFC3). In this example SFC1, SFC2 and SFC3 comprise maximum allowed peak-to-peak ripple of X1 dB, X2 dB and X3 dB, respectively, where X1<X2<X3. SFC1 may correspond to low level of peak-to-peak ripple while SFC2 may correspond to relatively higher level of peak-to-peak ripple. In one example X1=12 dB, X2=16 dB, and X3=20 dB. In another example X1=10 dB, X2=14 dB, and X3=18 dB. Three sets of spectrum flatness configurations are also illustrated by general examples in Table 5, Table 6 and Table 7. Also, three sets of configurations are illustrated by specific examples in Table 8 and Table 9.

TABLE 5

A general example of three sets of spectrum flatness configuration

| Configuration ID | spectrum flatness configuration | Maximum peak-to-peak transmit power ripple (dB) within frequency block |
|---|---|---|
| 0 | SFC1 | X1 |
| 1 | SFC2 | X2; |
| 2 | SFC3 | X3; where X3 > X2 > X1 |

TABLE 6

A general example of three sets of spectrum flatness configuration

| Configuration ID | spectrum flatness configuration | Maximum peak-to-peak transmit power ripple (dB) within frequency block |
|---|---|---|
| 0 | SFC1 | X1 |
| 1 | SFC2 | $\chi 1 + \Delta 1$ |
| 2 | SFC3 | $\chi 1 + \Delta 2$; where $\Delta 2 > \Delta 1$ |

TABLE 7

A general example of three sets of spectrum flatness configuration

| Configuration ID | spectrum flatness configuration | Maximum peak-to-peak transmit power ripple (dB) within frequency block |
|---|---|---|
| 0 | SFC1 | X1 |
| 1 | SFC2 | $\chi 1 + \Delta$ |
| 2 | SFC3 | $\chi 1 + 2*\Delta$; where $\Delta > 0$ |

TABLE 8

A specific example of three sets of spectrum flatness configuration

| Configuration ID | spectrum flatness configuration | Maximum peak-to-peak power ripple (dB) |
|---|---|---|
| 0 | SFC1 | 12 |
| 1 | SFC2 | 16 |
| 2 | SFC3 | 20 |

TABLE 9

A specific example of three sets of spectrum flatness configuration

| Configuration ID | spectrum flatness configuration | Maximum peak-to-peak power ripple (dB) |
|---|---|---|
| 0 | SFC1 | 12 |
| 1 | SFC2 | 12 + 4 |
| 2 | SFC3 | 12 + (2*4) |

In this above specific example in Table 9, Δ=4 dB as an example.

The spectrum flatness configurations applicable for signal modulated with same type of modulation scheme may further be associated with maximum power reduction (MPR) allowed by Node1 when transmitting signals to Node2. For example, two or more spectrum flatness configurations: a first set of a first spectrum flatness configuration (SFC1) and a first MPR (MPR1), and a second set of a second spectrum flatness configuration (SFC2) and a second MPR (MPR2). The MPR is required to reduce the transmit power of Node1 to meet radio emission requirements, e.g., emission outside the allocated carrier should be below certain thresholds to avoid or minimize the interference to the adjacent carriers. The MPR can be reduced with the increase in the SFC value because then the Node1 transmitter can operate close to the saturation point of the power amplifier. For example the MPR can even be a negative value, e.g., −1 or −2 dB, which means a UE with 23 dBm maximum power can transmit 24 or 25 dBm. Two sets of configurations, which also include MPR, are described by a general example in Table 10 and by a specific example in Table 11.

TABLE 10

A general example of two sets of spectrum flatness configuration comprising also MPR

| Configuration ID | spectrum flatness configuration | Maximum peak-to-peak transmit power ripple (dB) within frequency block | Maximum power reduction (dB) |
|---|---|---|---|
| 0 | SFC1 | X1 | M1 |
| 1 | SFC2 | X2; where X2 > X1 | M2 |

TABLE 11

A general example of two sets of spectrum flatness configuration comprising also MPR

| Configuration ID | spectrum flatness configuration | Maximum peak-to-peak transmit power ripple (dB) within frequency block | Maximum power reduction (dB) |
|---|---|---|---|
| 0 | SFC1 | 14 | 0 |
| 1 | SFC2 | 20 | −2 |

Criteria Used by Node2 or Node3 for Determining the Spectrum Flatness Configuration The radio node or network node that determines one or more of the plurality of spectrum flatness configurations, may do so based on one or more of the following criteria:

Receiver configuration of Node2: One important factor to determine the spectrum flatness configuration to be used by Node1 for transmitting signal to Node2 is the receiver configuration of Node2. An example of the receiver configuration is the processing capability of the equalizer filter implementation in Node2. The equalizer filter is used to mitigate distortion introduced in the transmitted signal by the transmitter in the frequency domain, e.g., by Node1. For example, if the spectrum flatness of the signal transmitted by Node1 is high (e.g., X2=20 dB in Table 3) then a more complex equalizer is needed in the receiver of Node2, compared to the case where the spectrum flatness of the signal transmitted by Node1 is low (e.g., X1=14 dB in Table 3). A more complex equalizer filter circuitry will require more equalizer coefficients or filter taps compared to a less complex equalizer filter circuitry. For example, for decoding signals associated with spectrum flatness of 20 dB and 14 dB, will require at least P number of filter coefficients and Q number of filter coefficients respectively in Node2 (e.g. in BS). In one non-limiting example, P=3 and Q=2. Therefore if number of filter coefficients in Node2 is above certain threshold then Node2 may select a spectrum flatness configuration associated with higher value of maximum peak-to-peak power variation (e.g., X2=20 dB in Table 3). Otherwise, Node2 selects the spectrum flatness configuration associated with a lower maximum peak-to-peak power variation threshold (e.g., X1=14 dB in Table 3).

Reference signal configuration transmitted by Node1: The reference signals (RS) transmitted by Node1 are used in Node2 to estimate the channel characteristic between Node1 and Node2. The estimated channel characteristic in turn is used to decode the signal received from Node1. Examples of RS are DMRS, SRS, etc. The RS can be configured with different densities in the time domain and/or frequency domain. For example, the RS density can be increased by increasing the frequency of the RS transmission resources in time and/or in frequency resources. Node2 may determine the spectrum flatness configuration based on the configuration of the RS transmitted by Node1 for enabling channel estimation at the Node2 receiver. For example, if RS density is high then the Node2 may select the spectrum flatness configuration associated with higher value of maximum peak-to-peak power variation (e.g., X2=20 dB in Table 3). This is because in this case, thanks to larger number of RSs, the Node2 can estimate the channel more accurately. Otherwise (if RS density is low), Node2 selects the spectrum flatness configuration associated with lower maximum peak-to-peak power variation threshold (e.g., X1=14 dB in table 3). As an example, RS density is considered high if the RS is transmitted at least once every other RB in the frequency domain; otherwise RS density is considered low.

Coverage level of Node1 with respect to Node2: Node2 may also determine the spectrum flatness configuration based on the coverage level of Node1 with respect to Node2. The coverage level can be expressed in terms of Node1 signal level. Examples of signal levels are path loss, SNR, SINR, etc. Node2 can determine the signal level by estimating signals (e.g., RS such as SRS, DMTS, etc.) transmitted by Node1. For example, if the signal level is below a threshold (H) (e.g., H<−1 dB) then Node2 may select the first spectrum flatness configuration (e.g., X1=14 dB in Table 3). This is because at lower signal level, there is noise and interference, which requires more processing in Node2 receiver to receive a signal with higher spectrum flatness. Otherwise, if the signal level is larger than or equal to the threshold (e.g., H−1 dB) then Node2 may select the second spectrum flatness configuration (e.g., X2=20 dB in Table 3).

Recommendation received from Node1. Node2 may also take into account information received from Node1 about a recommended or preferred spectrum flatness configuration. For example, Node2 may autonomously determine a spectrum flatness configuration based on one or more above criteria, and may also use the recommended configuration for deciding the final configuration. For example, if Node2 can receive and decode signals based on two or more spectrum flatness configurations, then Node2 may select the configuration which is also recommended by Node1. However if the configurations recommended by Node1 and autonomously determined by Node2 do not match, then Node2 may select the configuration which requires smallest amount of spectrum flatness. For example, if Node1 recommends configuration SFC2 (as described in Tables 1-4) while Node2 determines configuration SFC1 (as described in Tables 1-4) then Node2 may select configuration SFC1.

Based on modulation type recommendation from scheduler. Node2 may be informed about the modulation type to be used by Node1 for its transmissions. Based on this information, the Node2 can determine the appropriate spectral flatness configuration. As a specific example, if $\pi/2$-BPSK is used, then the SCF1 and SCF2 as described in Table 3 may be selected by Node2.

Mechanism in Node1 to Adapt Transmitter Configuration to Comply with Flatness Configuration Upon receiving information about the spectrum flatness configuration from Node 2 or Node 3, Node1 uses the received information to adapt its transmitter circuitry. Node1 uses the adapted transmitter circuitry to transmit the signal to Node2. The adapted transmitter circuitry ensures that the transmitted signal is compliant with spectrum flatness requirements, as indicated by the received information. For example if the received spectrum flatness configuration is SFC1, then the transmitter circuitry is adapted to ensure that the spectrum flatness requirement shall not exceed X1 in Table 1 (e.g., X1=14 dB in Table 3). But if the received spectrum flatness configuration is SFC2, then the transmitter circuitry is adapted to ensure that the spectrum flatness requirement shall not exceed X2 in Table 1 (e.g., X2=20 dB in Table 3). To achieve this objective (i.e., to ensure compliance with the received spectrum flatness configuration), Node1 must configure or adapt one or more parameters of its transmitter. Examples of such parameters are coefficients of filters, also known as filter taps. An example a filter is an Error Vector Magnitude (EVM) filter. Specific examples of EVM filters are FIR filter, spectrum shaping filter, etc. For example, Node1 can adaptively configure the values of the coefficients of an EVM equalizer filter in order to meet the requirement of the spectrum flatness configuration determined by Node2 or Node3.

In one example, filter coefficients are selected by Node1 to enable Node1 not to apply any spectrum shaping, or apply minimal spectrum shaping, e.g., to achieve spectrum flatness corresponding to SFC1. This may also be called an unshaped signal, or transmission of signal without spectrum shaping, or with minimal spectrum shaping. In another example, filter coefficients are selected by Node1 to enable Node1 to apply spectrum shaping, e.g., to achieve spectrum flatness corresponding to SFC2. This may also be called a shaped signal or transmission of signal with spectrum shaping.

Figure 2:
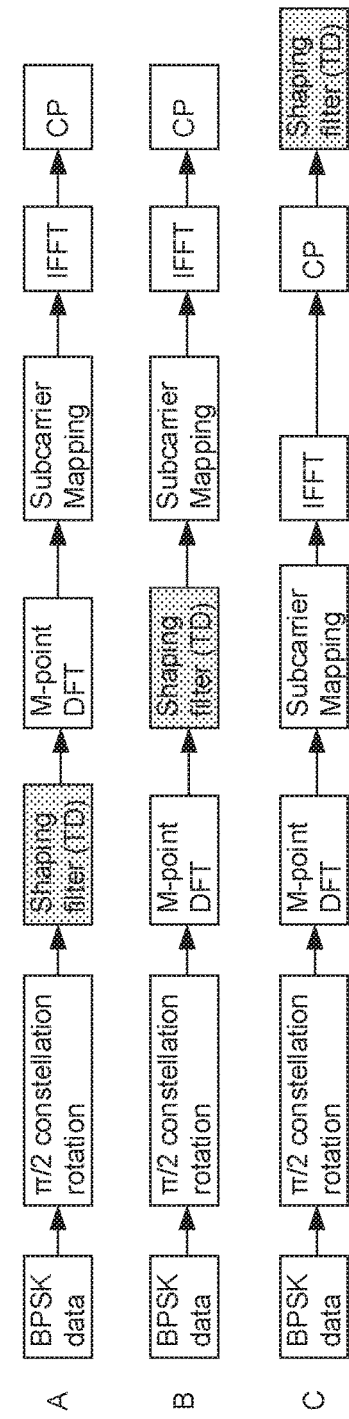
FIGS. 2A-2C are block diagrams of different configurations of transmitter chains.

For example, a digital FIR-filter with the location in the transmitter chain as depicted in FIG. 2A can be employed. As an example, the filter coefficients can be expressed in terms of two coefficients ($\alpha 1$, $\alpha 2$)=[1 D]; where the value 'D' of the second coefficient controls the amount of shaping. For example, 0 implies no shaping, i.e., [1 0] means no spectral shaping is applied, and [1 1] means spectral shaping is applied. Different values of D (e.g., 0.25, 0.5, etc.) may correspond to different amounts of spectral shaping. This means for example with ($\alpha 1$, $\alpha 2$)=[1 0] settings, Node1 can meet the requirement for SFC1 (e.g., 12 or 14 dB). On the other hand, with ($\alpha 1$, $\alpha 2$)=[1 1] settings, Node1 can meet the requirement for SFC2 (e.g., 18 or 20 dB). The filtering coefficients (e.g., value of D in this example) can be changed quickly by Node2 between transmissions (e.g., on TTI or frame basis) in case different shaping or distortion characteristics are desired by the system (e.g., Node2).

Method in a First Radio Node of Determining and Signaling Recommended Spectrum Flatness Configuration Toward the Second Radio Node According to another embodiment the first radio node (Node1), which will transmit a signal, itself determines a spectrum flatness configuration to be applied to the signal transmission to the second radio node. In one embodiment Node1 directly transmits information about the determined spectrum flatness configuration to Node2. In another embodiment Node1 may provide information about the determined spectrum flatness configuration to a third node (Node3), which in turn transmits the received information to Node2. In both cases, Node2 receives the information about the spectrum flatness configuration, which is applied by Node1 on signals transmitted to Node2. Node1 transmits the information to Node2 or Node 3 using higher layer signaling (e.g. RRC message) and/or using lower layer signaling (e.g. MAC, DCI over L1 channel such as PDCCH etc.).

Figure 9:
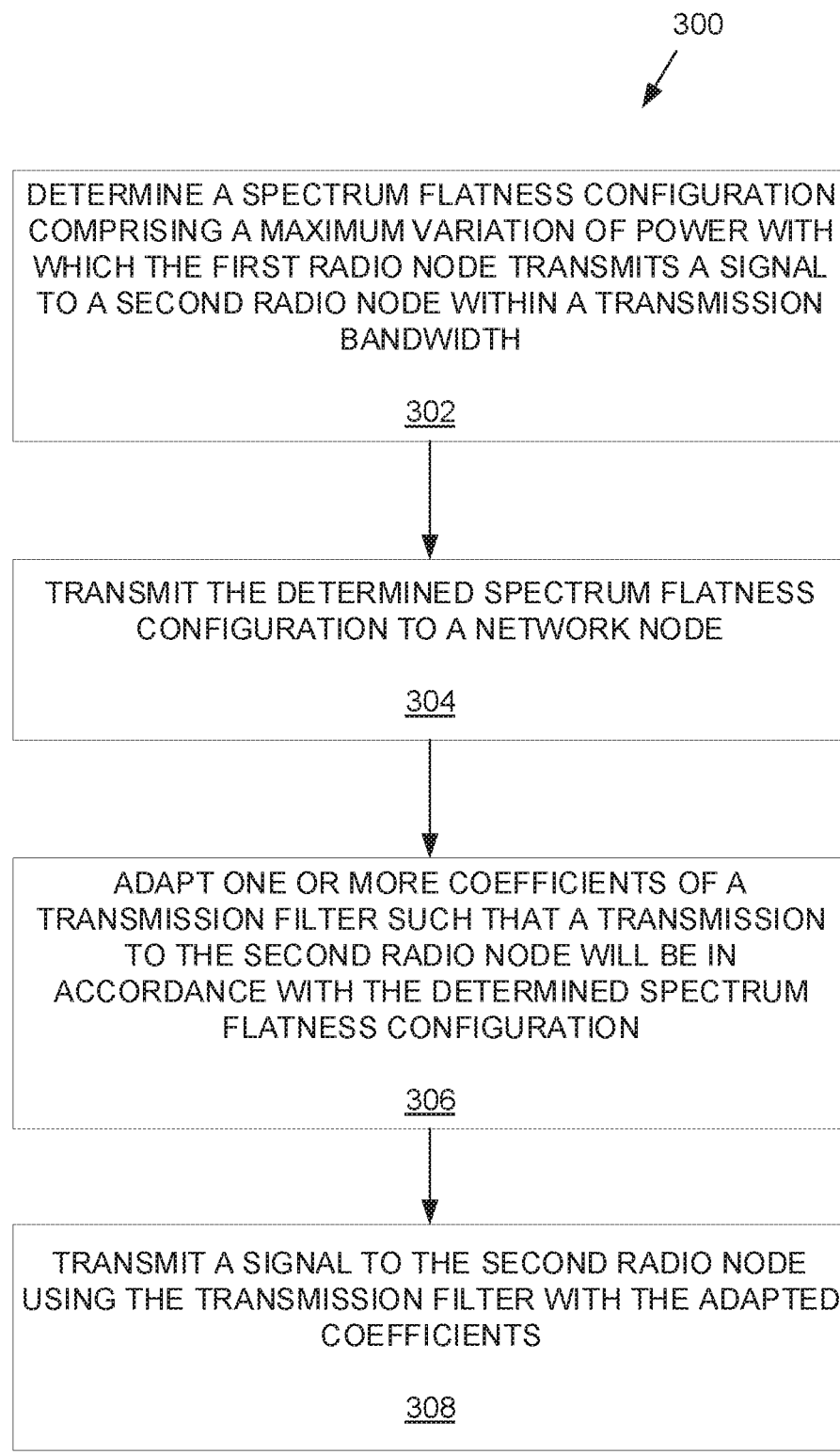
FIG. 9 is a flow diagram of a method, performed by a first radio node, of determining a spectrum flatness and adapting a transmitted signal to the determined spectrum flatness.

FIG. 9 depicts a method 300, performed by a first radio node operative in a wireless communication network, of determining a spectrum flatness and adapting a transmitted signal to the determined spectrum flatness, in accordance with particular embodiments. A spectrum flatness configuration, comprising a maximum variation of power with which the first radio node transmits a signal to a second radio node within a transmission bandwidth, is determined (block 302). The determined spectrum flatness configuration is transmitted to a network node (block 304). One or more coefficients of a transmission filter are adapted such that a transmission to the second radio node will be in accordance with the determined spectrum flatness configuration (block 306). A signal is transmitted to the second radio node using the transmission filter with the adapted coefficients (block 308).

Node1 may determine the spectrum flatness configuration out of a plurality of possible configurations, as described above. For example it may select one out of two possible spectrum flatness configurations. The different spectrum flatness configurations can be pre-defined or they can be created or generated by Node1, as described above.

Examples of spectrum flatness configurations described above, e.g., Tables 1-7, are also applicable to this embodiment.

Criteria Used by Node1 for Determining the Spectrum Flatness Configuration

The first radio node may determine one or more of the plurality of spectrum flatness configurations based on one or more of the following criteria:

Some of the criteria used by Node2 or Node3, as described above. For example, Node1 can also use the criteria related to Node2 receiver configuration, Node1 RS transmitter configuration, and Node1 coverage level with respect to Node2, as described above. In one embodiment, Node2 (or another network node) may configure Node1 with information regarding the configuration and capabilities of receiver circuits at Node2. For example, in the case that Node1 is a UE and Node2 is a gNB, the information may be included in System Information broadcast by Node2, or may be transmitted as configuration information to Node1 when Node1 initially accesses the wireless communication system. Accordingly, Node1 can select from among spectrum flatness configurations based, at least in part, on e.g., the numbers P, Q of filter coefficients in receiver filters at Node2. Furthermore, Node1 is aware of the RS configuration used by Node1 for transmitting signals to Node2. Therefore, Node1 can determine a suitable spectrum flatness configuration based on the RS transmitted by Node1 to Node2, as described above. Node1 can also determine its coverage level (e.g., signal level such as SINR, SNR, etc.) with respect to Node2 based on information (e.g., SNR measured at Node2) received from Node2 and/or by estimating the signal level of signals received from Node2. Therefore, Node1 can also determine suitable a spectrum flatness configuration based on the determined coverage level with respect to Node2.

Node1 power amplifier configuration. Node1 may also select a spectrum flatness configuration based on the configuration of the power amplifier (PA) used for transmitting signals to Node2. Examples of PA configurations are PA with different signal dynamic range, PA with multiple gain states within its signal dynamic range, etc. For example, if the PA has large signal dynamic range, then the UE can transmit signals with higher output power and still ensure signal linearity. This means higher output power will not require any power back-off to achieve radio emission requirements. In this case, Node1 can select a spectrum flatness configuration with higher maximum variation, e.g., SFC2 in Tables 1-4.

Node1 battery power: In the case that Node1 is a UE, it may also consider the impact of different spectrum flatness configurations on its battery power, in selecting or determining a particular spectrum flatness configuration. Examples of parameters associated with Node1 battery power are available or used battery power (e.g., amount or percentage of remaining or unused battery power), amount of power required to process and transmit signal requiring certain spectrum flatness configuration, etc. For example, if battery life (e.g., available power) is below a threshold, then Node1 may select a spectrum flatness configuration with lower maximum power variation (e.g., SFC1 in Tables 1-4). In this case, Node1 can conserve its battery by reducing the processing load, compared to the case when a spectrum flatness configuration with higher maximum power variation is selected. The reduction in processing load can be achieved since Node1 may have to process or operate spectrum shaping filtering with fewer taps or coefficients.

Mechanisms in Node2 of Using Spectrum Flatness Configuration Recommended by Node1

The information about the spectrum flatness configuration determined by Node1 is provided to Node2 (either directly, or via Node3) as a recommendation. Node2 may use the received information for one or more operational tasks. Examples of such tasks include:

using the received information to determine a suitable, or final, or eventual spectrum flatness configuration (e.g., by combining it with that determined autonomously by Node2 itself as described above);

adapting scheduling of signals in UL and/or DL. For example, if Node2 cannot receive a signal with the recommended spectrum flatness configuration, then Node2 may avoid scheduling Node1 with certain modulation and coding scheme (MCS), e.g., which involves particular type of modulation such as $\pi/2$-BPSK;

adapting receiver configuration, e.g., adapting filter coefficients for receiving signals; and adapting RS configuration of RS transmitted by Node1. For example if Node1 recommends a spectrum flatness configuration with higher variation (e.g., SFC2 in Tables 1-4), then Node2 may request to increase the number of RS transmitted by Node1 in time and/or in frequency domain by certain amount, e.g., increase by twice. Otherwise, Node2 may keep the existing RS configuration, or it may request to decrease the number of RS transmitted by Node1.

Functional Views of Apparatuses

Note that one or more of the apparatuses 10, 20, 30 described herein may perform the methods 100, 200, 300 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the processing circuitry 12, 22, 32 may include one or more microprocessor or microcontrollers, as well as other digital hardware, which may include digital signal processors (DSPs), special-purpose digital logic, and the like. The processing circuitry may be configured to execute program code stored in memory 14, 24, 34, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory 14, 24, 34, the memory stores program code that, when executed by the one or more processors 12, 22, 32, carries out the techniques described herein.

Figure 10:
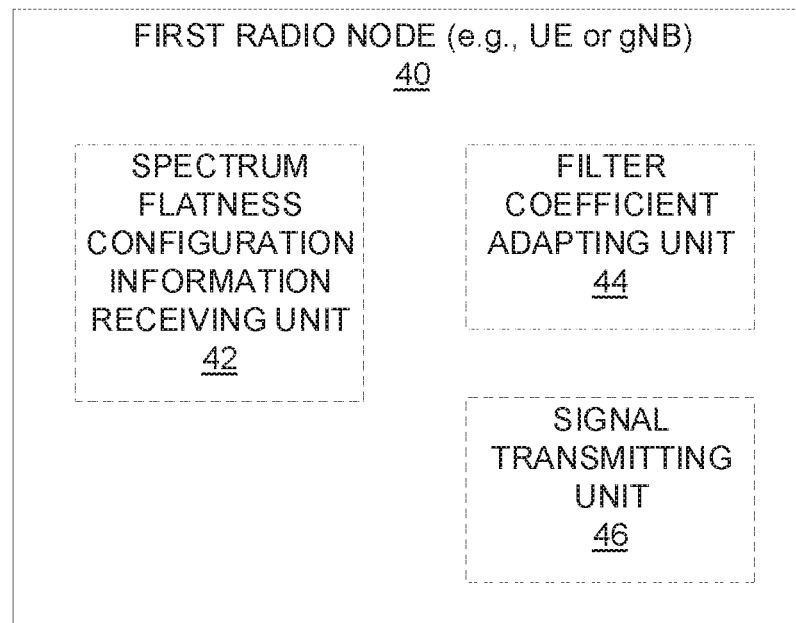
FIG. 10 is a block diagram of one embodiment of a first radio node, e.g., a UE or gNB, showing functional units.

FIG. 10 for example illustrates one embodiment of a first radio node 40, operative to perform the method 100, as implemented in accordance with one or more embodiments. As described above, the first radio node 40 may comprise a UE 10 or a BS 20 (e.g., gNB). FIG. 10 illustrates that the first radio node 40 implements various functional means, units, or modules, e.g., via the processing circuitry 12 in FIG. 4 or the processing circuitry 22 in FIG. 5, and/or via software code. These functional means, units, or modules, e.g., for implementing the method 100 herein, include for instance: spectrum flatness configuration information receiving unit 42, filter coefficient adapting unit 44, and signal transmitting unit 46. Spectrum flatness configuration information receiving unit 42 is configured to receive, from another radio node, information about a spectrum flatness configuration comprising a maximum variation of power with which the first radio node may transmit a signal to a second radio node within a transmission bandwidth. Filter coefficient adapting unit 44 is configured to adapt one or more coefficients of a transmission filter such that a transmission to the second radio node will be in accordance with the received spectrum flatness configuration. Signal transmitting unit 46 is configured to transmit a signal to the second radio node using the transmission filter with the adapted coefficients.

Figure 11:
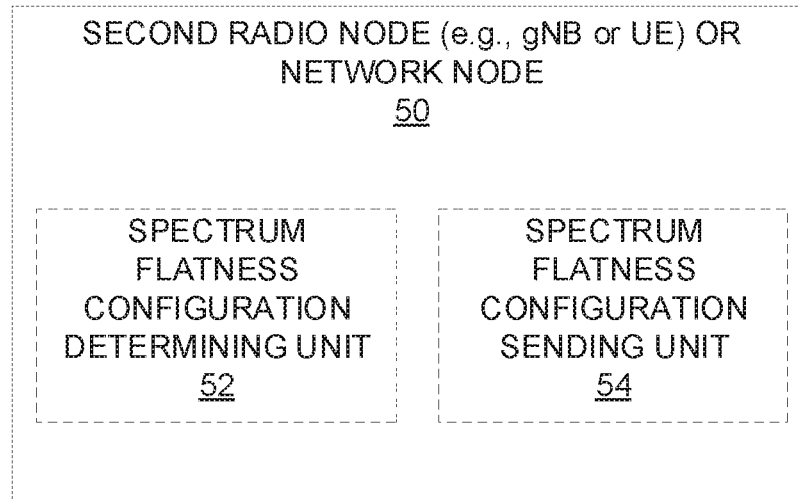
FIG. 11 is a block diagram of an embodiment of a second radio node, e.g., a UE or gNB, or network node, showing functional units.

FIG. 11 illustrates a second radio node or network node 50, operative to perform the method 200, as implemented in accordance with one or more embodiments. As described above, the node 50 may comprise a radio node such as a UE 10 or a BS 20 (e.g., gNB). Alternatively, the node 50 may comprise a network node 30. FIG. 11 illustrates a schematic block diagram of a second radio node or network node 50 in a wireless network according to still other embodiments. As shown, the second radio node or network node 50 implements various functional means, units, or modules, e.g., via the processing circuitry 12 in FIG. 4, the processing circuitry 22 in FIG. 5, or the processing circuitry 32 in FIG. 6, and/or via software code. These functional means, units, or modules, e.g., for implementing the method 200 herein, include for instance: spectrum flatness configuration determining unit 52 and spectrum flatness configuration sending unit 54. Spectrum flatness configuration determining unit 52 is configured to determine one or more spectrum flatness configurations, each comprising a maximum variation of power with which a first radio node may transmit a signal to a second radio node within a transmission bandwidth. Spectrum flatness configuration sending unit 54 is configured to send information about the spectrum flatness configurations towards the first radio node. For example, in the case that the node 50 is a second radio node, sending information about the spectrum flatness configurations towards the first radio node comprises sending the information directly to the first radio node. In the case that the node 50 is a network node (e.g., Node3), sending information about the spectrum flatness configurations towards the first radio node comprises sending the information to the second radio node, which relays it to the first radio node.

Figure 12:
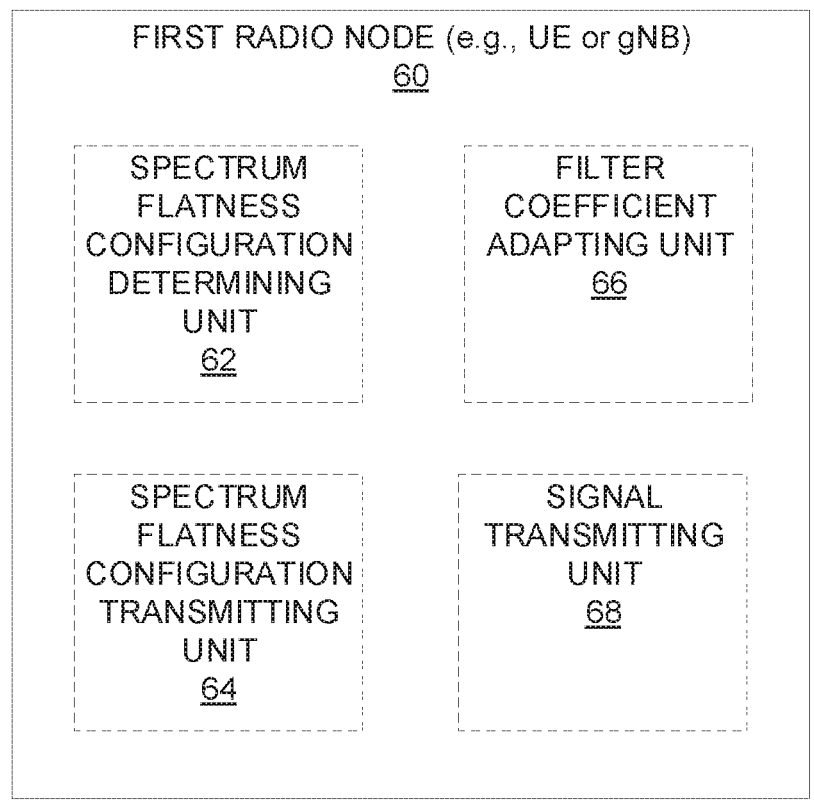
FIG. 12 is a block diagram of another embodiment of a first radio node, e.g., a UE or gNB, showing functional units.

FIG. 12 illustrates another embodiment of a first radio node 60, operative to perform the method 300, as implemented in accordance with one or more embodiments. As described above, the first radio node 60 may comprise a UE 10 or a BS 20 (e.g., gNB). FIG. 12 illustrates that the first radio node 60 implements various functional means, units, or modules, e.g., via the processing circuitry 12 in FIG. 4 or the processing circuitry 22 in FIG. 5, and/or via software code. These functional means, units, or modules, e.g., for implementing the method 300 herein, include for instance: spectrum flatness configuration information determining unit 62, spectrum flatness configuration information transmitting unit 64, filter coefficient adapting unit 64, and signal transmitting unit 66. Spectrum flatness configuration information determining unit 62 is configured to determine a spectrum flatness configuration comprising a maximum variation of power with which the first radio node transmits a signal to a second radio node within a transmission bandwidth. Spectrum flatness configuration information transmitting unit 64 is configured to transmit the determined spectrum flatness configuration to a network node. Filter coefficient adapting unit 44 is configured to adapt one or more coefficients of a transmission filter such that a transmission to the second radio node will be in accordance with the determined spectrum flatness configuration. Signal transmitting unit 46 is configured to transmit a signal to the second radio node using the transmission filter with the adapted coefficients. In one embodiment, the spectrum flatness configuration information transmitting unit 64 is configured to transmit the determined spectrum flatness configuration directly to the second radio node. In another embodiment, the spectrum flatness configuration information transmitting unit 64 is configured to transmit the determined spectrum flatness configuration directly to another network node (e.g., Node3), which in turn sends it to the second radio node.

Computer Programs

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Advantages Over the Prior Art

Embodiments of the present invention present numerous advantages over the prior art. They provide for dynamic or semi-static adaptation of the spectrum flatness of signals transmitted by a first radio node based on, e.g., the receiver implementation of a second radio node. Embodiments facilitate a tradeoff or compromise between larger coverage (e.g., higher UE output power) and BS receiver complexity. Different base station implementations (with varying processing capability) can receive and process $\pi/2$-BPSK signals from the UE. All base stations do not need to implement a complex receiver for $\pi/2$-BPSK signals from the UE, which reduces overall network complexity, cost and deployment effort. All base stations do not need to configure all the UEs with larger number of reference signals in the UL, reducing overhead due to the RSs, and therefore enhancing the network capacity.

Over the Top Embodiments

Figure 13:
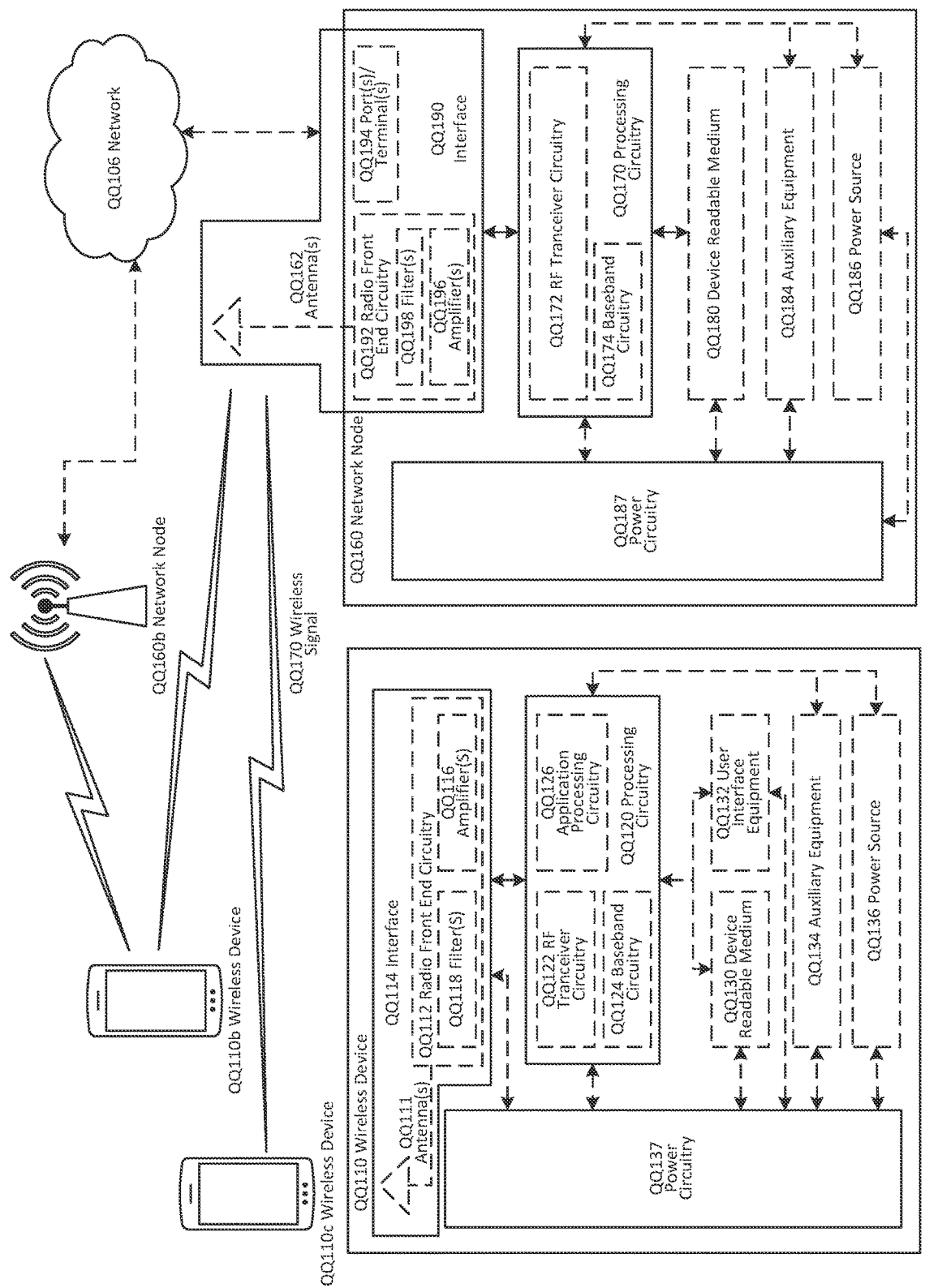
FIG. 13 is a block diagram of a network and some network components.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 13 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 14:
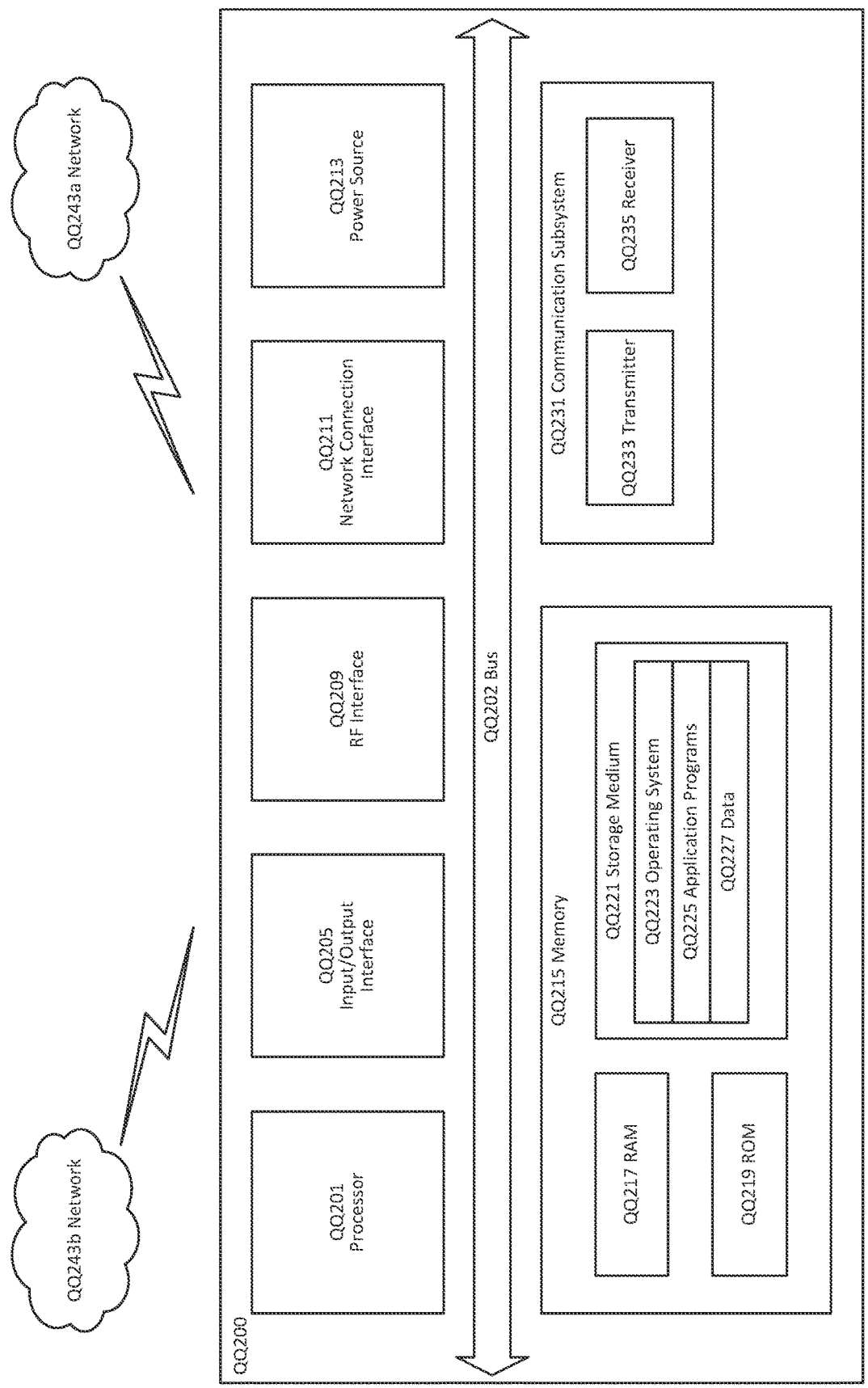
FIG. 14 is a block diagram of a User Equipment.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 14, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802. QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 15:
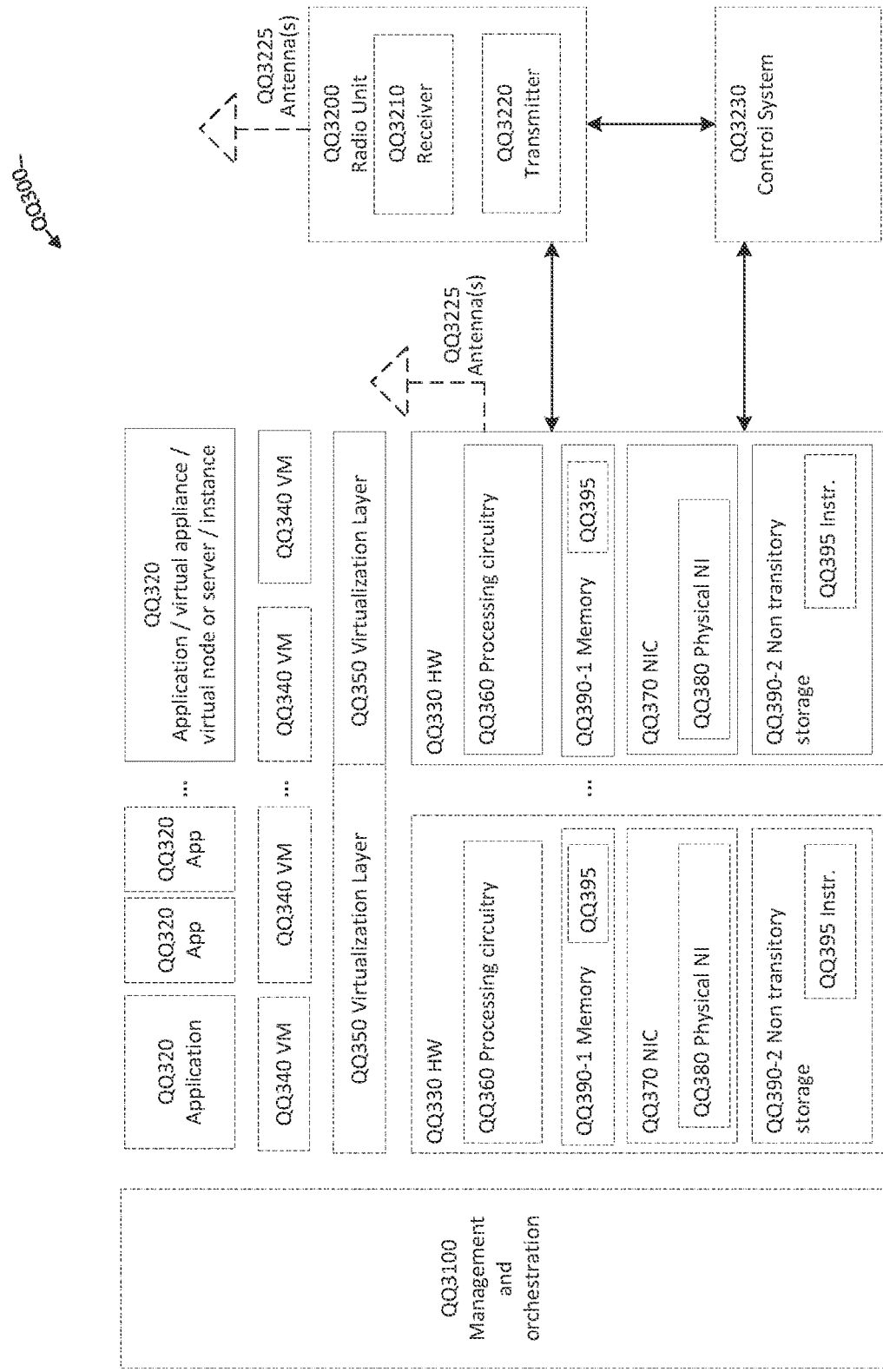
FIG. 15 is a schematic block diagram illustrating a virtualization environment.

FIG. 15 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 15, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 15.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 16:
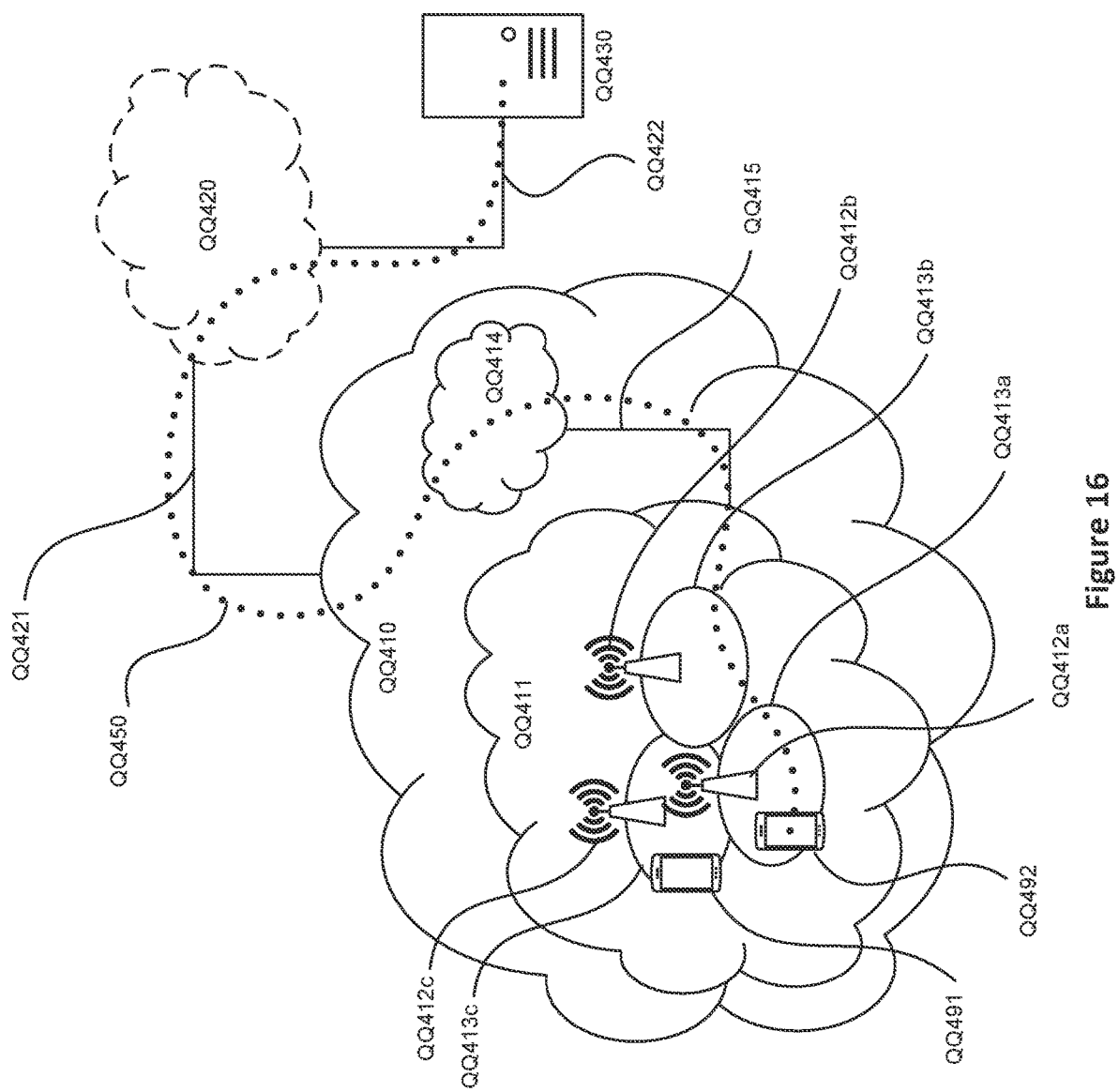
FIG. 16 illustrates a telecommunication network connected via an intermediate network to a host computer.

FIG. 16 illustrates a telecommunication network connected via an intermediate network to a host computer in accordance with some embodiments. In particular, with reference to FIG. 16, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 16 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 17:
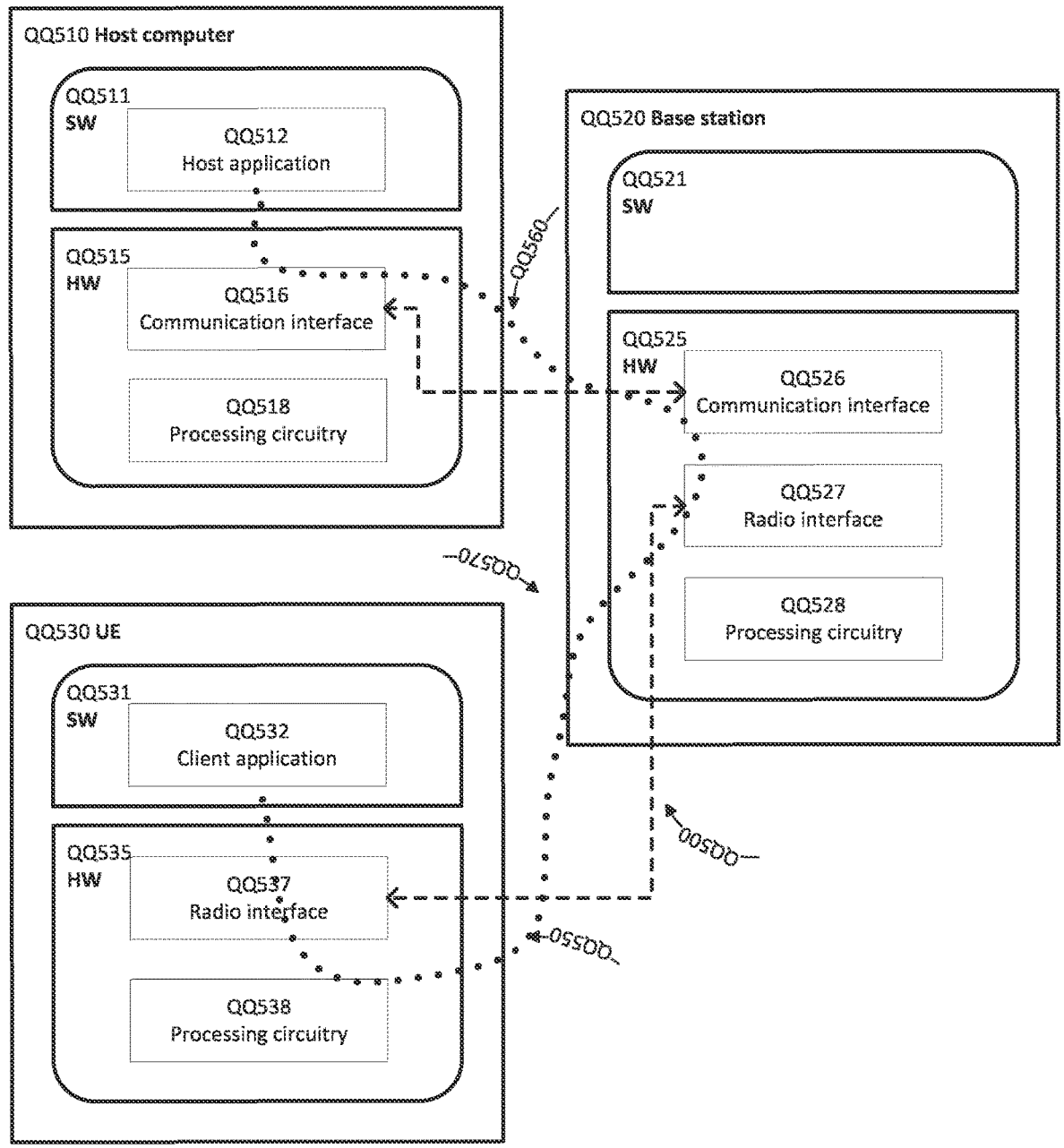
FIG. 17 illustrates host computer communicating via a base station with a user equipment over a partially wireless connection.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 17) served by base station QQ520. Communication interface QQ526 may be configured to facilitate connection QQ560 to host computer QQ510. Connection QQ560 may be direct or it may pass through a core network (not shown in FIG. 17) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 17 may be similar or identical to host computer QQ430, one of base stations QQ412a, QQ412b, QQ412c and one of UEs QQ491, QQ492 of FIG. 16, respectively. This is to say, the inner workings of these entities may be as shown in FIG. 17 and independently, the surrounding network topology may be that of FIG. 16.

In FIG. 17, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the match between greater UE coverage and base station receiver complexity, and reducing the number of reference signals transmitted by a UE, and thereby provide benefits such as reduced base station receiver complexity, greater variety of base station implementations, increased system capacity.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 18:
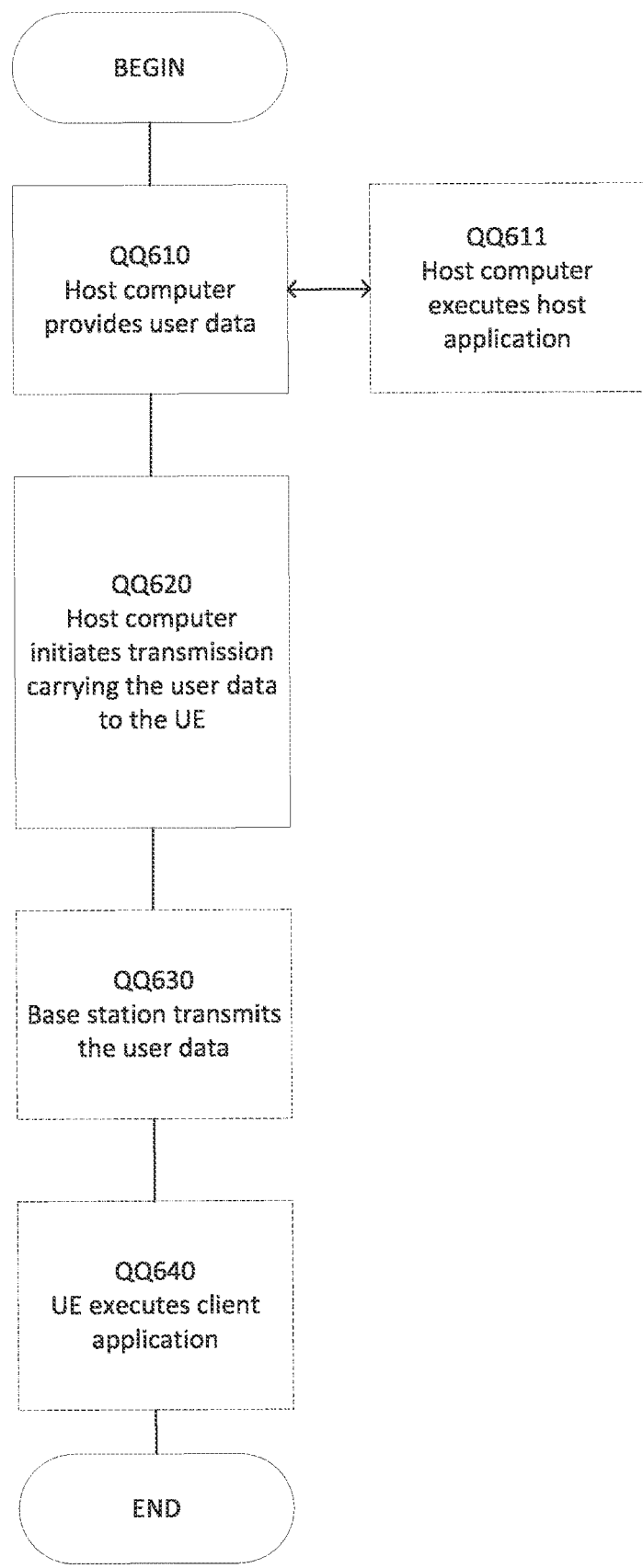
FIG. 18 is a flowchart illustrating a host computer communicating with a UE in a communication system.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 19:
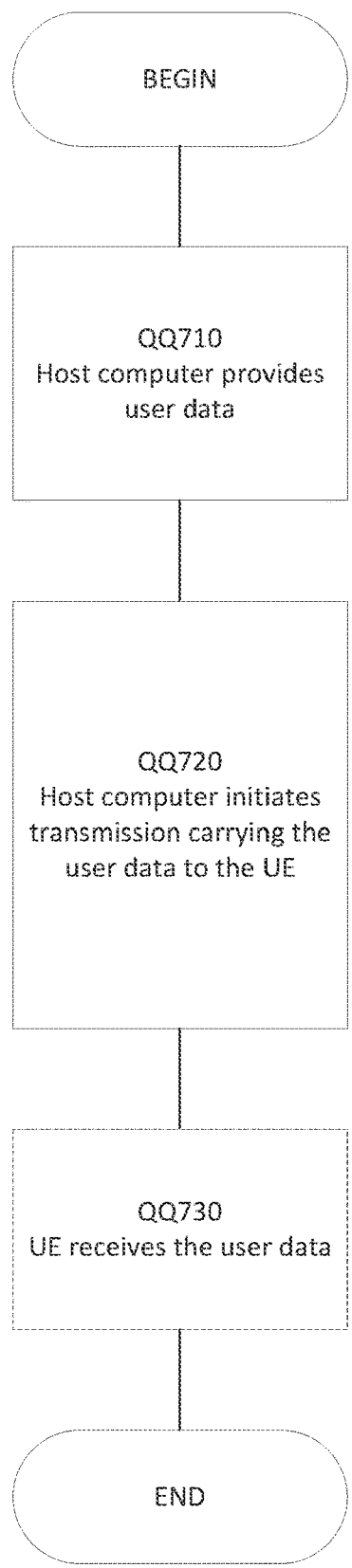
FIG. 19 is a flowchart illustrating a host computer communicating with a UE in a communication system.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 20:
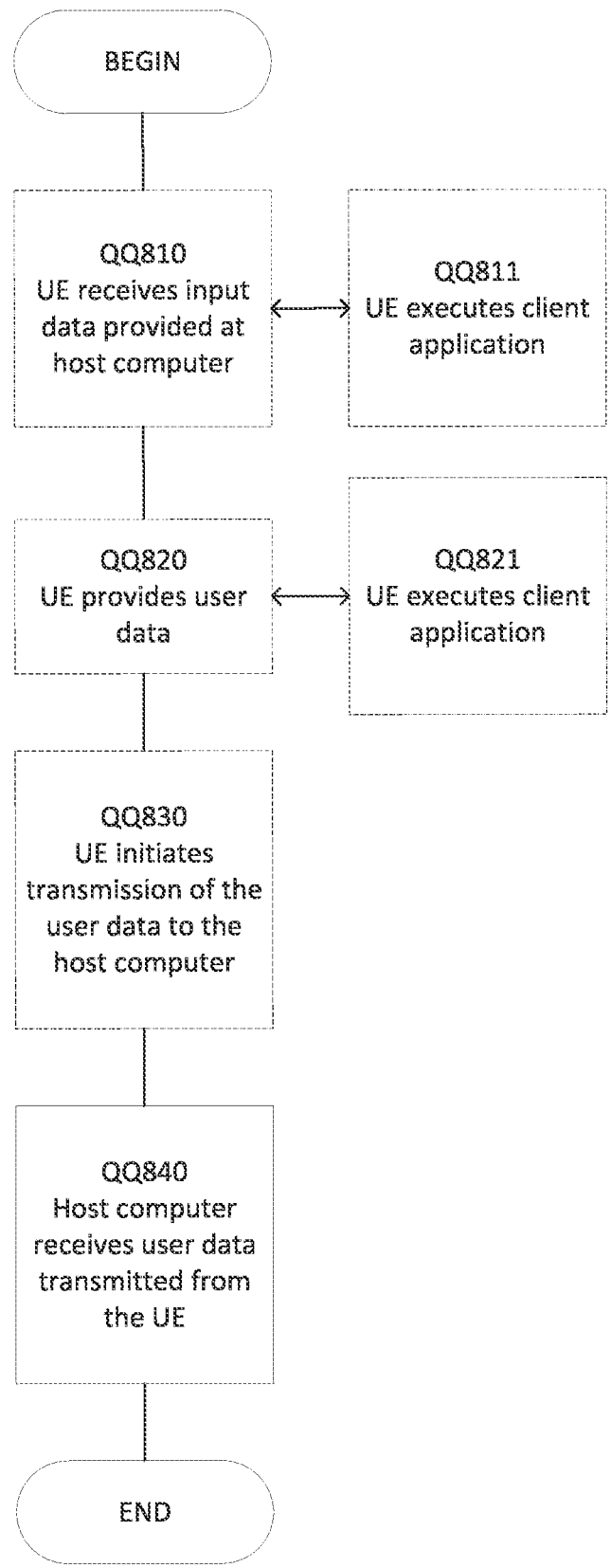
FIG. 20 is a flowchart illustrating a UE communicating with a host computer in a communication system.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 21:
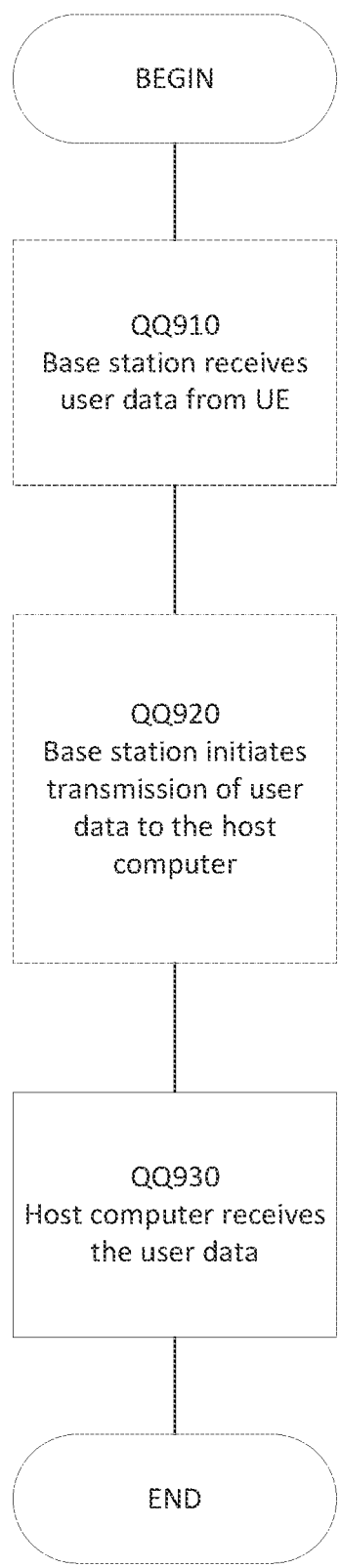
FIG. 21 is a flowchart illustrating communication between a base station and a host computer in a communication system.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following specific embodiments illustrate implementation of embodiments of the present invention in Over the Top embodiments, with reference to the claims:

Group A Embodiments include claims 1, 2, 4-12, 20, and embodiment AA:

AA. The method of any of claims 1, 2, 4-12 and 20, further comprising:
  providing user data; and
  forwarding the user data to a host computer via the transmission to the base station.

Group B Embodiments include claims 1, 3 and 5-20 and embodiment BB:

BB. The method of any of claims 1, 3 and 5-20, further comprising:
  obtaining user data; and
  forwarding the user data to a host computer or a wireless device.

Group C Embodiments:

C1. A wireless device configured to perform any of the steps of any of the Group A embodiments.

C2. A wireless device comprising:
  processing circuitry configured to perform any of the steps of any of the Group A embodiments; and
  power supply circuitry configured to supply power to the wireless device.

C3. A wireless device comprising:
  processing circuitry and memory, the memory containing instructions executable by the processing circuitry whereby the wireless device is configured to perform any of the steps of any of the Group A embodiments.

C4. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:
  processing circuitry configured to perform any of the steps of any of the Group B embodiments;
  power supply circuitry configured to supply power to the wireless device.

C9. A base station comprising:
  processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments:

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE),
    wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
  communication interface configured to receive user data originating from a transmission from a user equipment (UE) to a base station,
    wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
  the processing circuitry of the host computer is configured to execute a host application; and
  the UE's processing circuitry is configured to execute a client application associated with the host application, thereby providing the user data.

D18. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

D19. A method implemented in a communication system including a host computer, a base station and a user equipment (UE), the method comprising:
  at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
  at the UE, executing a client application, thereby providing the user data to be transmitted; and
  at the host computer, executing a host application associated with the client application.

D22. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
  the processing circuitry of the host computer is configured to execute a host application;
  the UE is configured to execute a client application associated with the host application, thereby providing the user data to be received by the host computer.

D27. A method implemented in a communication system including a host computer, a base station and a user equipment (UE), the method comprising:
  at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method, performed by a first radio node operative in a wireless communication network, of adapting a spectrum flatness of a transmitted signal, the method comprising:
  receiving, from a network node, information about a spectrum flatness configuration comprising a maximum variation of power with which the first radio node may transmit a signal to a second radio node within a transmission bandwidth;

adapting one or more coefficients of a transmission filter such that a transmission to the second radio node will be in accordance with the received spectrum flatness configuration; and transmitting a signal to the second radio node using the transmission filter with the adapted coefficients.

2. The method of claim h wherein the information about the spectrum flatness configuration comprises a pre-defined identifier identifying one of a plurality of spectrum flatness configurations.

3. The method of claim 1, wherein the information about the spectrum flatness configuration comprises at least a maximum allowed peak-to-peak power variation and a bandwidth over which the configuration is applicable.

4. The method of claim 1, wherein the spectrum flatness configuration is associated with a type of modulation.

5. The method of claim 4, wherein the information about the spectrum flatness configuration comprises a plurality of different spectrum flatness configuration, each comprising a different maximum variation of power with which the first radio node may transmit a signal to a second radio node within a transmission bandwidth.

6. The method of claim 4, wherein the information about the spectrum flatness configuration comprises spectrum flatness configuration comprises a predetermined amount in excess of the first spectrum flatness configuration.

7. The method of claim 4, further comprising:
obtaining information about a maximum power reduction; and
wherein transmitting a signal using the transmission filter with the adapted coefficients further comprises transmitting the signal using the maximum power reduction.

8. The method of claim 1, wherein adapting one or more coefficients of a transmission filter comprises adapting coefficients of an Error Vector Magnitude, EVM, filter.

9. The method of claim 8, wherein adapting coefficients of the EVM filter comprises applying coefficients $(\alpha 1, \alpha 2)$ to a digital Finite Impulse Response filter, where $(\alpha 1, \alpha 2)=[1, D]$ and D is in the range $[0 \ldots 1]$ and denotes an amount of spectral shaping to be applied.

10. A method, performed by a network node operative in a wireless communication network, of determining an acceptable spectrum flatness of a transmitted signal, the method comprising:
determining one or more spectrum flatness configurations, each comprising a maximum variation of power with which a first radio node may transmit a signal to a second radio node within a transmission bandwidth; and
sending information about the spectrum flatness configurations towards the first radio node.

11. The method of claim 10, wherein the network node is a node other than the first and second radio nodes, and wherein sending information about the spectrum flatness configurations towards the first radio node comprises sending the information to the second radio node, for transmission to the first radio node.

12. The method of claim 10, wherein determining one or more spectrum flatness configurations comprises determining one or more spectrum flatness configurations in response to a coverage level, expressed in terms of the signal level, of the first radio node with respect to the second radio node.

13. The method of claim 10, further comprising:
receiving, from the first radio node, a recommended spectrum flatness configuration; and
wherein determining one or more spectrum flatness configurations comprises determining one or more spectrum flatness configurations at least partially in response to the spectrum flatness configuration recommended by the first radio node.

14. A first radio node, operative in a wireless communication network, the first radio node comprising:
wireless communication circuitry; and
processing circuitry operatively connected to the wireless communication circuitry, the processing circuitry configured to:
receive, from another radio node, information about a spectrum flatness configuration comprising a maximum variation of power with which the first radio node may transmit a signal to a second radio node within a transmission bandwidth;
adapt one or more coefficients of a transmission filter such that a transmission to the second radio node will be in accordance with the obtained spectrum flatness configuration; and
transmit a signal to the second radio node using the transmission filter with the adapted coefficients.

15. The first radio node of claim 14, wherein the first radio node is a wireless device and the second radio node is a network node.

16. The first radio node of claim 14 wherein the first radio node is a network node and the second radio node is a wireless device.

17. The first radio node of claim 14, wherein both the first and second radio nodes are wireless devices capable of Device-to-Device communication.

18. A network node, operative in a wireless communication network, the network node comprising:
communication circuitry; and
processing circuitry operatively connected to the communication circuitry, the processing circuitry configured to:
determine one or more spectrum flatness configurations, each comprising a maximum variation of power with which a first radio node may transmit a signal to a second radio node within a transmission bandwidth; and
send information about the spectrum flatness configurations towards the first radio node.

19. The network node of claim 18, wherein the network node is the second radio node.

20. The network node of claim 18, wherein the network node is a node other than the first and second radio nodes, and wherein sending information about the spectrum flatness configurations towards the first radio node comprises sending the information to the second radio node, for transmission to the first radio node.

* * * * *